US011211656B2

United States Patent
Matecki et al.

(10) Patent No.: US 11,211,656 B2
(45) Date of Patent: Dec. 28, 2021

(54) VEHICLE BATTERY TRAY WITH INTEGRATED BATTERY RETENTION AND SUPPORT FEATURE

(71) Applicant: Shape Corp., Grand Haven, MI (US)

(72) Inventors: Joseph Robert Matecki, Allendale, MI (US); Mark Charles Stephens, Grand Rapids, MI (US); Jeffrey McHenry, Norton Shores, MI (US); Matthew Kuipers, Zeeland, MI (US)

(73) Assignee: Shape Corp., Grand Haven, MI (US)

( * ) Notice: Subject to any disclaimer, the term of this patent is extended or adjusted under 35 U.S.C. 154(b) by 469 days.

(21) Appl. No.: 15/981,068

(22) Filed: May 16, 2018

(65) Prior Publication Data

US 2018/0337374 A1    Nov. 22, 2018

Related U.S. Application Data

(60) Provisional application No. 62/506,949, filed on May 16, 2017, provisional application No. 62/649,641, filed on Mar. 29, 2018.

(51) Int. Cl.
*B60K 1/04* (2019.01)
*H01M 50/20* (2021.01)
(Continued)

(52) U.S. Cl.
CPC .............. *H01M 50/20* (2021.01); *B60K 1/04* (2013.01); *H01M 10/656* (2015.04);
(Continued)

(58) Field of Classification Search
CPC .............. B60K 1/04; B60K 2001/005; B60K 2001/0438; B60K 2001/0405
See application file for complete search history.

(56) References Cited

U.S. PATENT DOCUMENTS 3,708,028 A    1/1973 Hafer
3,930,552 A    1/1976 Kunkle et al.
(Continued)

FOREIGN PATENT DOCUMENTS

AT    511428 A1    11/2012
AT    511670 A1    1/2013
(Continued)

OTHER PUBLICATIONS

International Searching Authority (KR), International Search Report and Written Opinion for International Application No. PCT/IB2017/055002, dated Jul. 19, 2018.
(Continued)

*Primary Examiner* — Emma K Frick
(74) *Attorney, Agent, or Firm* — Bodman PLC

(57) ABSTRACT

A battery tray for an electric vehicle includes a battery support structure that has a floor and a perimeter wall extending around a peripheral portion of the floor to border a battery containment area. A plurality of cross members are coupled with the perimeter wall at opposing sides of the battery support structure, where the cross members extend laterally across the battery containment area. A cover is engaged with an upper portion of the perimeter wall of the battery support structure. The cover, the floor, and/or the cross members may include a retention element that is integrally formed therewith and that is configured to engage a component that is disposed in the battery containment area.

8 Claims, 9 Drawing Sheets

(51) Int. Cl.
*H01M 10/656* (2014.01)
*H01M 10/613* (2014.01)
*H01M 10/625* (2014.01)
*H01M 10/6572* (2014.01)
*H01M 10/6567* (2014.01)
*H01M 10/6556* (2014.01)
*H01M 10/6561* (2014.01)
*B60K 1/00* (2006.01)

(52) U.S. Cl.
CPC .............. *B60K 2001/005* (2013.01); *B60K 2001/0438* (2013.01); *H01M 10/613* (2015.04); *H01M 10/625* (2015.04); *H01M 10/6556* (2015.04); *H01M 10/6561* (2015.04); *H01M 10/6567* (2015.04); *H01M 10/6572* (2015.04); *H01M 2200/10* (2013.01); *H01M 2220/20* (2013.01)

(56) References Cited

U.S. PATENT DOCUMENTS

| | | |
|---|---|---|
| 3,983,952 A | 10/1976 | McKee |
| 4,174,014 A | 11/1979 | Bjorksten |
| 4,252,206 A | 2/1981 | Burkholder et al. |
| 4,317,497 A | 3/1982 | Alt et al. |
| 4,339,015 A | 7/1982 | Fowkes et al. |
| 4,506,748 A | 3/1985 | Thomas |
| 5,015,545 A | 5/1991 | Brooks |
| 5,198,638 A | 3/1993 | Massacesi |
| 5,378,555 A | 1/1995 | Waters et al. |
| 5,390,754 A | 2/1995 | Masuyama et al. |
| 5,392,873 A | 2/1995 | Masuyama et al. |
| 5,476,151 A | 12/1995 | Tsuchida et al. |
| 5,501,289 A | 3/1996 | Nishikawa et al. |
| 5,513,721 A | 5/1996 | Ogawa et al. |
| 5,523,666 A | 6/1996 | Hoelzl et al. |
| 5,534,364 A | 7/1996 | Watanabe et al. |
| 5,549,443 A | 8/1996 | Hammerslag |
| 5,555,950 A | 9/1996 | Harada et al. |
| 5,558,949 A | 9/1996 | Iwatsuki et al. |
| 5,561,359 A | 10/1996 | Matsuura et al. |
| 5,567,542 A | 10/1996 | Bae |
| 5,585,204 A | 12/1996 | Oshida et al. |
| 5,585,205 A | 12/1996 | Kohchi |
| 5,612,606 A | 3/1997 | Guimarin et al. |
| 5,620,057 A | 4/1997 | Klemen et al. |
| 5,624,003 A * | 4/1997 | Matsuki .................. B60L 58/26 180/65.1 |
| 5,709,280 A | 1/1998 | Beckley et al. |
| 5,736,272 A | 4/1998 | Veenstra et al. |
| 5,760,569 A | 6/1998 | Chase, Jr. |
| 5,833,023 A | 11/1998 | Shimizu |
| 5,853,058 A | 12/1998 | Endo et al. |
| 5,866,276 A | 2/1999 | Ogami et al. |
| 5,934,053 A | 8/1999 | Fillman et al. |
| 6,040,080 A | 3/2000 | Minami et al. |
| 6,079,984 A | 6/2000 | Torres et al. |
| 6,085,854 A | 7/2000 | Nishikawa |
| 6,094,927 A | 8/2000 | Anazawa et al. |
| 6,109,380 A | 8/2000 | Veenstra |
| 6,130,003 A | 10/2000 | Etoh et al. |
| 6,158,538 A | 12/2000 | Botzelmann et al. |
| 6,188,574 B1 | 2/2001 | Anazawa |
| 6,189,635 B1 | 2/2001 | Schuler et al. |
| 6,220,380 B1 | 4/2001 | Mita et al. |
| 6,227,322 B1 | 5/2001 | Nishikawa |
| 6,260,645 B1 | 7/2001 | Pawlowski et al. |
| 6,270,150 B1 * | 8/2001 | Miller .................. B62D 21/17 296/184.1 |
| 6,402,229 B1 | 6/2002 | Suganuma |
| 6,406,812 B1 | 6/2002 | Dreulle et al. |
| 6,462,949 B1 | 10/2002 | Parish, IV et al. |
| 6,541,151 B2 | 4/2003 | Minamiura et al. |
| 6,541,154 B2 | 4/2003 | Oogami et al. |
| 6,565,836 B2 | 5/2003 | Ovshinsky et al. |
| 6,598,691 B2 | 7/2003 | Mita et al. |
| 6,648,090 B2 | 11/2003 | Iwase |
| 6,668,957 B2 | 12/2003 | King |
| 6,736,229 B1 | 5/2004 | Amori et al. |
| 6,811,197 B1 | 11/2004 | Grabowski et al. |
| 7,004,274 B2 | 2/2006 | Shibasawa et al. |
| 7,017,361 B2 | 3/2006 | Kwon |
| 7,070,015 B2 | 7/2006 | Mathews et al. |
| 7,128,999 B1 | 10/2006 | Martin et al. |
| 7,201,384 B2 | 4/2007 | Chaney |
| 7,207,405 B2 | 4/2007 | Reid et al. |
| 7,221,123 B2 | 5/2007 | Chen |
| 7,249,644 B2 | 7/2007 | Honda et al. |
| 7,267,190 B2 | 9/2007 | Hirano |
| 7,323,272 B2 | 1/2008 | Ambrosio et al. |
| 7,401,669 B2 | 7/2008 | Fujii et al. |
| 7,405,022 B2 | 7/2008 | Kang et al. |
| 7,412,309 B2 | 8/2008 | Honda |
| 7,416,039 B1 | 8/2008 | Anderson et al. |
| 7,424,926 B2 | 9/2008 | Tsuchiya |
| 7,427,156 B2 | 9/2008 | Ambrosio et al. |
| 7,501,793 B2 | 3/2009 | Kadouchi et al. |
| 7,507,499 B2 | 3/2009 | Zhou et al. |
| 7,520,355 B2 | 4/2009 | Chaney |
| 7,610,978 B2 | 11/2009 | Takasaki et al. |
| 7,654,351 B2 | 2/2010 | Koike et al. |
| 7,654,352 B2 | 2/2010 | Takasaki et al. |
| 7,661,370 B2 | 2/2010 | Pike et al. |
| 7,686,111 B2 | 3/2010 | Koenekamp et al. |
| 7,687,192 B2 | 3/2010 | Yoon et al. |
| 7,713,655 B2 | 5/2010 | Ha et al. |
| 7,749,644 B2 | 7/2010 | Nishino |
| 7,807,288 B2 | 10/2010 | Yoon et al. |
| 7,854,282 B2 | 12/2010 | Lee et al. |
| 7,858,229 B2 | 12/2010 | Shin et al. |
| 7,875,378 B2 | 1/2011 | Yang et al. |
| 7,879,480 B2 | 2/2011 | Yoon et al. |
| 7,879,485 B2 | 2/2011 | Yoon et al. |
| 7,926,602 B2 | 4/2011 | Takasaki |
| 7,931,105 B2 | 4/2011 | Sato et al. |
| 7,948,207 B2 | 5/2011 | Scheucher |
| 7,967,093 B2 | 6/2011 | Nagasaka |
| 7,984,779 B2 | 7/2011 | Boegelein et al. |
| 7,990,105 B2 | 8/2011 | Matsumoto et al. |
| 7,993,155 B2 | 8/2011 | Heichal et al. |
| 7,997,368 B2 | 8/2011 | Takasaki et al. |
| 8,006,626 B2 | 8/2011 | Kumar et al. |
| 8,006,793 B2 | 8/2011 | Heichal et al. |
| 8,012,620 B2 | 9/2011 | Takasaki et al. |
| 8,034,476 B2 | 10/2011 | Ha et al. |
| 8,037,954 B2 | 10/2011 | Taguchi |
| 8,079,435 B2 | 12/2011 | Takasaki et al. |
| 8,091,669 B2 | 1/2012 | Taneda et al. |
| 8,110,300 B2 | 2/2012 | Niedzwiecki et al. |
| 8,146,694 B2 | 4/2012 | Hamidi |
| 8,163,420 B2 | 4/2012 | Okada et al. |
| 8,167,070 B2 | 5/2012 | Takamura et al. |
| 8,186,468 B2 | 5/2012 | Parrett et al. |
| 8,187,736 B2 | 5/2012 | Park et al. |
| 8,205,702 B2 | 6/2012 | Hoermandinger et al. |
| 8,206,846 B2 | 6/2012 | Yang et al. |
| 8,210,301 B2 | 7/2012 | Hashimoto et al. |
| 8,211,564 B2 | 7/2012 | Choi et al. |
| 8,256,552 B2 | 9/2012 | Okada |
| 8,268,469 B2 | 9/2012 | Hermann et al. |
| 8,268,472 B2 | 9/2012 | Ronning et al. |
| 8,276,697 B2 | 10/2012 | Takasaki |
| 8,286,743 B2 | 10/2012 | Rawlinson |
| 8,298,698 B2 | 10/2012 | Chung et al. |
| 8,304,104 B2 | 11/2012 | Lee et al. |
| 8,307,930 B2 | 11/2012 | Sailor et al. |
| 8,323,819 B2 | 12/2012 | Lee et al. |
| 8,327,962 B2 | 12/2012 | Bergmeier et al. |
| 8,343,647 B2 | 1/2013 | Ahn et al. |
| 8,353,374 B2 | 1/2013 | Sugawara et al. |
| 8,371,401 B1 | 2/2013 | Illustrato |
| 8,397,853 B2 | 3/2013 | Stefani et al. |
| 8,409,743 B2 | 4/2013 | Okada et al. |
| 8,418,795 B2 | 4/2013 | Sasage et al. |

(56) References Cited

U.S. PATENT DOCUMENTS

| | | |
|---|---|---|
| 8,420,245 B2 | 4/2013 | Im et al. |
| 8,439,144 B2 | 5/2013 | Murase |
| 8,453,773 B2 | 6/2013 | Hill et al. |
| 8,453,778 B2 | 6/2013 | Bannier et al. |
| 8,455,122 B2 | 6/2013 | Shin et al. |
| 8,465,866 B2 | 6/2013 | Kim |
| 8,481,343 B2 | 7/2013 | Hsin et al. |
| 8,486,557 B2 | 7/2013 | Lee et al. |
| 8,492,016 B2 | 7/2013 | Shin et al. |
| 8,501,344 B2 | 8/2013 | Yang et al. |
| 8,511,412 B2 | 8/2013 | Kawaguchi et al. |
| 8,540,282 B2 | 9/2013 | Yoda et al. |
| 8,551,640 B2 | 10/2013 | Hedrich et al. |
| 8,557,425 B2 | 10/2013 | Ronning et al. |
| 8,561,743 B2 | 10/2013 | Iwasa et al. |
| 8,563,155 B2 | 10/2013 | Lee et al. |
| 8,567,543 B2 | 10/2013 | Kubota et al. |
| 8,584,780 B2 | 11/2013 | Yu et al. |
| 8,587,907 B2 | 11/2013 | Gaben |
| 8,592,069 B1 | 11/2013 | Anderson et al. |
| 8,602,139 B2 | 12/2013 | Takamura et al. |
| 8,609,271 B2 | 12/2013 | Yoon et al. |
| 8,658,303 B2 | 2/2014 | Chung et al. |
| 8,672,077 B2 | 3/2014 | Sand et al. |
| 8,672,354 B2 | 3/2014 | Kim et al. |
| 8,689,918 B2 | 4/2014 | Yu et al. |
| 8,689,919 B2 | 4/2014 | Maeda et al. |
| 8,691,421 B2 | 4/2014 | Lee et al. |
| 8,708,080 B2 | 4/2014 | Lee et al. |
| 8,708,402 B2 | 4/2014 | Saeki |
| 8,709,628 B2 | 4/2014 | Carignan et al. |
| 8,722,224 B2 | 5/2014 | Lee et al. |
| 8,728,648 B2 | 5/2014 | Choo et al. |
| 8,733,486 B2 | 5/2014 | Nishiura et al. |
| 8,733,488 B2 | 5/2014 | Umetani |
| 8,739,908 B2 | 6/2014 | Taniguchi et al. |
| 8,739,909 B2 | 6/2014 | Hashimoto et al. |
| 8,741,466 B2 | 6/2014 | Youngs et al. |
| 8,746,391 B2 | 6/2014 | Atsuchi et al. |
| 8,757,304 B2 | 6/2014 | Amano et al. |
| 8,789,634 B2 | 7/2014 | Nitawaki |
| 8,794,365 B2 | 8/2014 | Matsuzawa et al. |
| 8,802,259 B2 | 8/2014 | Lee et al. |
| 8,803,477 B2 | 8/2014 | Kittell |
| 8,808,893 B2 | 8/2014 | Choo et al. |
| 8,818,588 B2 | 8/2014 | Ambrosio et al. |
| 8,820,444 B2 | 9/2014 | Nguyen |
| 8,820,461 B2 | 9/2014 | Shinde et al. |
| 8,827,023 B2 | 9/2014 | Matsuda et al. |
| 8,833,495 B2 | 9/2014 | Iwata et al. |
| 8,833,499 B2 | 9/2014 | Rawlinson |
| 8,835,033 B2 | 9/2014 | Choi et al. |
| 8,841,013 B2 | 9/2014 | Choo et al. |
| 8,846,233 B2 | 9/2014 | Lee et al. |
| 8,846,234 B2 | 9/2014 | Lee et al. |
| 8,852,794 B2 | 10/2014 | Laitinen |
| 8,859,126 B2 * | 10/2014 | Yamada ............ H01M 10/6556 429/100 |
| 8,862,296 B2 | 10/2014 | Kurakawa et al. |
| 8,865,332 B2 | 10/2014 | Yang et al. |
| 8,875,828 B2 | 11/2014 | Rawlinson et al. |
| 8,895,173 B2 | 11/2014 | Gandhi et al. |
| 8,900,736 B2 | 12/2014 | Choi et al. |
| 8,905,170 B2 | 12/2014 | Kyoden et al. |
| 8,905,171 B2 | 12/2014 | Lee et al. |
| 8,911,899 B2 | 12/2014 | Lim et al. |
| 8,936,125 B2 | 1/2015 | Nakamori |
| 8,939,245 B2 | 1/2015 | Jaffrezic |
| 8,939,246 B2 | 1/2015 | Yamaguchi et al. |
| 8,951,655 B2 | 2/2015 | Chung et al. |
| 8,960,346 B2 | 2/2015 | Ogawa |
| 8,967,312 B2 * | 3/2015 | Yanagi ................ H01M 2/1038 180/68.5 |
| 8,970,061 B2 | 3/2015 | Nakagawa et al. |
| 8,973,697 B2 | 3/2015 | Matsuda |
| 8,975,774 B2 | 3/2015 | Kreutzer et al. |
| 8,978,800 B2 | 3/2015 | Soma' et al. |
| 8,980,458 B2 | 3/2015 | Honjo et al. |
| 8,986,864 B2 | 3/2015 | Wiegmann et al. |
| 9,004,535 B2 | 4/2015 | Wu |
| 9,012,051 B2 | 4/2015 | Lee et al. |
| 9,017,846 B2 | 4/2015 | Kawatani et al. |
| 9,023,502 B2 | 5/2015 | Favaretto |
| 9,023,503 B2 | 5/2015 | Seong et al. |
| 9,024,572 B2 | 5/2015 | Nishihara et al. |
| 9,033,084 B2 | 5/2015 | Joye |
| 9,033,085 B1 | 5/2015 | Rawlinson |
| 9,034,502 B2 | 5/2015 | Kano et al. |
| 9,052,168 B1 | 6/2015 | Rawlinson |
| 9,054,402 B1 | 6/2015 | Rawlinson |
| 9,061,714 B1 | 6/2015 | Albery et al. |
| 9,065,103 B2 | 6/2015 | Straubel et al. |
| 9,070,926 B2 | 6/2015 | Seong et al. |
| 9,073,426 B2 | 7/2015 | Tachikawa et al. |
| 9,077,058 B2 | 7/2015 | Yang et al. |
| 9,090,218 B2 | 7/2015 | Karashima |
| 9,093,701 B2 | 7/2015 | Kawatani et al. |
| 9,101,060 B2 | 8/2015 | Yamanaka et al. |
| 9,102,362 B2 | 8/2015 | Baccouche et al. |
| 9,126,637 B2 | 9/2015 | Eberle et al. |
| 9,136,514 B2 | 9/2015 | Kawatani et al. |
| 9,156,340 B2 | 10/2015 | van den Akker |
| 9,159,968 B2 | 10/2015 | Park et al. |
| 9,159,970 B2 | 10/2015 | Watanabe et al. |
| 9,160,042 B2 | 10/2015 | Fujii et al. |
| 9,160,214 B2 | 10/2015 | Matsuda |
| 9,172,071 B2 | 10/2015 | Yoshioka et al. |
| 9,174,520 B2 | 11/2015 | Katayama et al. |
| 9,184,477 B2 | 11/2015 | Jeong et al. |
| 9,192,450 B2 | 11/2015 | Yamashita et al. |
| 9,193,316 B2 | 11/2015 | McLaughlin et al. |
| 9,196,882 B2 | 11/2015 | Seong et al. |
| 9,203,064 B2 | 12/2015 | Lee et al. |
| 9,203,124 B2 | 12/2015 | Chung et al. |
| 9,205,749 B2 | 12/2015 | Sakamoto |
| 9,205,757 B2 | 12/2015 | Matsuda |
| 9,216,638 B2 | 12/2015 | Katayama et al. |
| 9,227,582 B2 | 1/2016 | Katayama et al. |
| 9,231,285 B2 | 1/2016 | Schmidt et al. |
| 9,236,587 B2 | 1/2016 | Lee et al. |
| 9,236,589 B2 | 1/2016 | Lee |
| 9,238,495 B2 | 1/2016 | Matsuda |
| 9,246,148 B2 | 1/2016 | Maguire |
| 9,252,409 B2 | 2/2016 | Lee et al. |
| 9,254,871 B2 | 2/2016 | Hotta et al. |
| 9,263,249 B2 | 2/2016 | Tomohiro et al. |
| 9,269,934 B2 | 2/2016 | Yang et al. |
| 9,277,674 B2 | 3/2016 | Watanabe |
| 9,281,505 B2 | 3/2016 | Hihara et al. |
| 9,281,546 B2 | 3/2016 | Chung et al. |
| 9,283,837 B1 | 3/2016 | Rawlinson |
| 9,306,201 B2 | 4/2016 | Lu et al. |
| 9,306,247 B2 | 4/2016 | Rawlinson |
| 9,308,829 B2 | 4/2016 | Matsuda |
| 9,308,966 B2 | 4/2016 | Kosuge et al. |
| 9,312,579 B2 | 4/2016 | Jeong et al. |
| 9,321,357 B2 | 4/2016 | Caldeira et al. |
| 9,321,433 B2 | 4/2016 | Yin et al. |
| 9,327,586 B2 | 5/2016 | Miyashiro |
| 9,331,321 B2 | 5/2016 | Berger et al. |
| 9,331,366 B2 | 5/2016 | Fuerstner et al. |
| 9,333,868 B2 | 5/2016 | Uchida et al. |
| 9,337,455 B2 | 5/2016 | Yang et al. |
| 9,337,457 B2 | 5/2016 | Yajima et al. |
| 9,337,458 B2 | 5/2016 | Kim |
| 9,337,516 B2 | 5/2016 | Klausner et al. |
| 9,346,346 B2 | 5/2016 | Murray |
| 9,350,003 B2 | 5/2016 | Wen et al. |
| 9,358,869 B2 | 6/2016 | Le Jaouen et al. |
| 9,373,828 B2 | 6/2016 | Kawatani et al. |
| 9,381,798 B2 | 7/2016 | Meyer-Ebeling |
| 9,412,984 B2 | 8/2016 | Fritz et al. |
| 9,413,043 B2 | 8/2016 | Kim et al. |
| 9,425,628 B2 | 8/2016 | Pham et al. |

(56) References Cited

U.S. PATENT DOCUMENTS

| | | |
|---|---|---|
| 9,434,243 B2 | 9/2016 | Nakao |
| 9,434,270 B1 | 9/2016 | Penilla et al. |
| 9,434,333 B2 | 9/2016 | Sloan et al. |
| 9,444,082 B2 | 9/2016 | Tsujimura et al. |
| 9,446,643 B1 | 9/2016 | Vollmer |
| 9,450,228 B2 | 9/2016 | Sakai et al. |
| 9,452,686 B2 | 9/2016 | Yang et al. |
| 9,457,666 B2 | 10/2016 | Caldeira et al. |
| 9,461,284 B2 | 10/2016 | Power et al. |
| 9,461,454 B2 | 10/2016 | Auguet et al. |
| 9,463,695 B2 | 10/2016 | Matsuda et al. |
| 9,478,778 B2 | 10/2016 | Im et al. |
| 9,481,249 B2 | 11/2016 | Yamazaki |
| 9,484,564 B2 | 11/2016 | Stuetz et al. |
| 9,484,592 B2 | 11/2016 | Roh et al. |
| 9,487,237 B1 | 11/2016 | Vollmer |
| 9,502,700 B2 | 11/2016 | Haussman |
| 9,520,624 B2 | 12/2016 | Lee et al. |
| 9,531,041 B2 | 12/2016 | Hwang |
| 9,533,546 B2 | 1/2017 | Cheng |
| 9,533,600 B1 | 1/2017 | Schwab et al. |
| 9,537,186 B2 | 1/2017 | Chung et al. |
| 9,537,187 B2 | 1/2017 | Chung et al. |
| 9,540,055 B2 | 1/2017 | Berger et al. |
| 9,545,962 B2 | 1/2017 | Pang |
| 9,545,968 B2 | 1/2017 | Miyashiro et al. |
| 9,561,735 B2 | 2/2017 | Nozaki |
| 9,564,663 B2 | 2/2017 | Kim et al. |
| 9,564,664 B2 | 2/2017 | Tanigaki et al. |
| 9,579,963 B2 | 2/2017 | Landgraf |
| 9,579,983 B2 | 2/2017 | Inoue |
| 9,579,986 B2 | 2/2017 | Bachir |
| 9,590,216 B2 | 3/2017 | Maguire et al. |
| 9,597,973 B2 | 3/2017 | Penilla et al. |
| 9,597,976 B2 | 3/2017 | Dickinson et al. |
| 9,608,244 B2 | 3/2017 | Shin et al. |
| 9,614,206 B2 | 4/2017 | Choi et al. |
| 9,614,260 B2 | 4/2017 | Kim et al. |
| 9,616,766 B2 | 4/2017 | Fujii |
| 9,620,826 B2 | 4/2017 | Yang et al. |
| 9,623,742 B2 | 4/2017 | Ikeda et al. |
| 9,623,911 B2 | 4/2017 | Kano et al. |
| 9,627,664 B2 | 4/2017 | Choo et al. |
| 9,627,666 B2 | 4/2017 | Baldwin |
| 9,630,483 B2 | 4/2017 | Yamada et al. |
| 9,636,984 B1 | 5/2017 | Baccouche et al. |
| 9,643,660 B2 | 5/2017 | Vollmer |
| 9,647,251 B2 | 5/2017 | Prinz et al. |
| 9,653,712 B2 | 5/2017 | Seong et al. |
| 9,660,236 B2 | 5/2017 | Kondo et al. |
| 9,660,288 B2 | 5/2017 | Gendlin et al. |
| 9,660,304 B2 | 5/2017 | Choi et al. |
| 9,673,433 B1 | 6/2017 | Pullalarevu et al. |
| 9,673,495 B2 | 6/2017 | Lee et al. |
| 9,692,095 B2 | 6/2017 | Harris |
| 9,694,772 B2 | 7/2017 | Ikeda et al. |
| 9,718,340 B2 | 8/2017 | Berger et al. |
| 9,789,908 B2 | 10/2017 | Tsukada et al. |
| 9,796,424 B2 | 10/2017 | Sakaguchi et al. |
| 9,802,650 B2 | 10/2017 | Nishida et al. |
| 9,884,597 B2 * | 2/2018 | Matecki ............... B60R 19/18 |
| 10,059,382 B2 | 8/2018 | Nusier et al. |
| 10,131,381 B2 * | 11/2018 | Ashraf .................. B60K 1/04 |
| 10,166,883 B2 * | 1/2019 | Brendecke ......... H01M 10/625 |
| 10,483,510 B2 * | 11/2019 | Stephens ............ H01M 2/1077 |
| 10,589,614 B2 * | 3/2020 | Ovgard ................ B60L 50/64 |
| 2001/0046624 A1 | 11/2001 | Goto et al. |
| 2001/0052433 A1 | 12/2001 | Harris et al. |
| 2002/0066608 A1 | 6/2002 | Guenard et al. |
| 2003/0089540 A1 | 5/2003 | Koike et al. |
| 2003/0188417 A1 | 10/2003 | McGlinchy et al. |
| 2003/0209375 A1 | 11/2003 | Suzuki et al. |
| 2003/0230443 A1 | 12/2003 | Cramer et al. |
| 2004/0142232 A1 | 7/2004 | Risca et al. |
| 2004/0261377 A1 | 12/2004 | Sung |
| 2005/0095500 A1 | 5/2005 | Corless et al. |
| 2006/0001399 A1 | 1/2006 | Salasoo et al. |
| 2006/0024566 A1 | 2/2006 | Plummer |
| 2007/0020513 A1 * | 1/2007 | Medina ............... H01M 10/655 429/120 |
| 2008/0179040 A1 | 7/2008 | Rosenbaum |
| 2008/0199771 A1 | 8/2008 | Chiu |
| 2008/0238152 A1 | 10/2008 | Konishi et al. |
| 2008/0280192 A1 | 11/2008 | Drozdz et al. |
| 2008/0311468 A1 | 12/2008 | Hermann et al. |
| 2009/0014221 A1 | 1/2009 | Kim et al. |
| 2009/0058355 A1 | 3/2009 | Meyer |
| 2010/0025131 A1 | 2/2010 | Gloceri et al. |
| 2010/0112419 A1 | 5/2010 | Jang et al. |
| 2010/0159317 A1 | 6/2010 | Taghikhani et al. |
| 2010/0173191 A1 | 7/2010 | Meintschel et al. |
| 2010/0307848 A1 | 12/2010 | Hashimoto et al. |
| 2011/0036657 A1 | 2/2011 | Bland et al. |
| 2011/0070474 A1 | 3/2011 | Lee et al. |
| 2011/0104530 A1 | 5/2011 | Muller et al. |
| 2011/0123309 A1 | 5/2011 | Berdelle-Hilge et al. |
| 2011/0132580 A1 | 6/2011 | Herrmann et al. |
| 2011/0143179 A1 | 6/2011 | Nakamori |
| 2011/0168461 A1 | 7/2011 | Meyer-Ebeling |
| 2011/0206967 A1 * | 8/2011 | Itsuki ..................... B60L 50/66 429/120 |
| 2011/0240385 A1 | 10/2011 | Farmer |
| 2012/0091955 A1 | 4/2012 | Gao |
| 2012/0103714 A1 | 5/2012 | Choi et al. |
| 2012/0118653 A1 | 5/2012 | Ogihara et al. |
| 2012/0125702 A1 | 5/2012 | Bergfjord |
| 2012/0129031 A1 | 5/2012 | Kim |
| 2012/0160583 A1 | 6/2012 | Rawlinson |
| 2012/0223113 A1 | 9/2012 | Gaisne et al. |
| 2012/0298433 A1 | 11/2012 | Ohkura |
| 2012/0301765 A1 | 11/2012 | Loo et al. |
| 2012/0312610 A1 | 12/2012 | Kim et al. |
| 2013/0020139 A1 | 1/2013 | Kim et al. |
| 2013/0122337 A1 | 5/2013 | Katayama et al. |
| 2013/0122338 A1 | 5/2013 | Katayama et al. |
| 2013/0143081 A1 | 6/2013 | Watanabe et al. |
| 2013/0164580 A1 | 6/2013 | Au |
| 2013/0192908 A1 | 8/2013 | Schlagheck |
| 2013/0230759 A1 | 9/2013 | Jeong et al. |
| 2013/0270863 A1 | 10/2013 | Young et al. |
| 2013/0273829 A1 | 10/2013 | Obasih et al. |
| 2013/0284531 A1 | 10/2013 | Oonuma et al. |
| 2013/0337297 A1 | 12/2013 | Lee et al. |
| 2014/0017546 A1 | 1/2014 | Yanagi |
| 2014/0045026 A1 | 2/2014 | Fritz et al. |
| 2014/0072845 A1 | 3/2014 | Oh et al. |
| 2014/0072856 A1 | 3/2014 | Chung et al. |
| 2014/0087228 A1 | 3/2014 | Fabian et al. |
| 2014/0120406 A1 | 5/2014 | Kim |
| 2014/0141298 A1 | 5/2014 | Michelitsch |
| 2014/0178721 A1 | 6/2014 | Chung et al. |
| 2014/0193683 A1 | 7/2014 | Mardall et al. |
| 2014/0202671 A1 | 7/2014 | Yan |
| 2014/0212723 A1 | 7/2014 | Lee et al. |
| 2014/0242429 A1 | 8/2014 | Lee et al. |
| 2014/0246259 A1 | 9/2014 | Yamamura et al. |
| 2014/0262573 A1 | 9/2014 | Ito et al. |
| 2014/0272501 A1 | 9/2014 | O'Brien et al. |
| 2014/0284125 A1 | 9/2014 | Katayama et al. |
| 2014/0302360 A1 | 10/2014 | Klammler et al. |
| 2014/0315064 A1 * | 10/2014 | Katayama ............ B60L 58/27 429/120 |
| 2014/0322583 A1 | 10/2014 | Choi et al. |
| 2014/0338999 A1 | 11/2014 | Fujii et al. |
| 2015/0004458 A1 | 1/2015 | Lee |
| 2015/0010795 A1 | 1/2015 | Tanigaki et al. |
| 2015/0053493 A1 | 2/2015 | Kees et al. |
| 2015/0056481 A1 | 2/2015 | Cohen et al. |
| 2015/0060164 A1 | 3/2015 | Wang et al. |
| 2015/0061381 A1 | 3/2015 | Biskup |
| 2015/0061413 A1 | 3/2015 | Janarthanam et al. |
| 2015/0064535 A1 | 3/2015 | Seong et al. |
| 2015/0104686 A1 | 4/2015 | Brommer et al. |
| 2015/0136506 A1 | 5/2015 | Quinn et al. |

(56) References Cited

U.S. PATENT DOCUMENTS

| | | |
|---|---|---|
| 2015/0188207 A1 | 7/2015 | Son et al. |
| 2015/0204583 A1 | 7/2015 | Stephan et al. |
| 2015/0207115 A1 | 7/2015 | Wondraczek |
| 2015/0236326 A1 | 8/2015 | Kim et al. |
| 2015/0243956 A1 | 8/2015 | Loo et al. |
| 2015/0255764 A1 | 9/2015 | Loo et al. |
| 2015/0259011 A1 | 9/2015 | Deckard et al. |
| 2015/0280188 A1 | 10/2015 | Nozaki et al. |
| 2015/0291046 A1 | 10/2015 | Kawabata |
| 2015/0298661 A1 | 10/2015 | Zhang |
| 2015/0314830 A1 | 11/2015 | Inoue |
| 2015/0329174 A1 | 11/2015 | Inoue |
| 2015/0329175 A1 | 11/2015 | Inoue |
| 2015/0329176 A1 | 11/2015 | Inoue |
| 2015/0344081 A1 | 12/2015 | Kor et al. |
| 2016/0023689 A1 | 1/2016 | Berger et al. |
| 2016/0028056 A1 | 1/2016 | Lee et al. |
| 2016/0068195 A1 | 3/2016 | Hentrich et al. |
| 2016/0072108 A1 | 3/2016 | Keller et al. |
| 2016/0087319 A1 | 3/2016 | Roh et al. |
| 2016/0093856 A1 | 3/2016 | DeKeuster et al. |
| 2016/0133899 A1 | 5/2016 | Qiao et al. |
| 2016/0137046 A1 | 5/2016 | Song |
| 2016/0141738 A1 | 5/2016 | Kwag |
| 2016/0149177 A1 | 5/2016 | Sugeno et al. |
| 2016/0156005 A1 | 6/2016 | Elliot et al. |
| 2016/0159221 A1 | 6/2016 | Chen et al. |
| 2016/0164053 A1 | 6/2016 | Lee et al. |
| 2016/0167544 A1 | 6/2016 | Barbat et al. |
| 2016/0176312 A1 | 6/2016 | Duhaime et al. |
| 2016/0197332 A1 | 7/2016 | Lee et al. |
| 2016/0197386 A1 | 7/2016 | Moon et al. |
| 2016/0197387 A1 | 7/2016 | Lee et al. |
| 2016/0204398 A1 | 7/2016 | Moon et al. |
| 2016/0207418 A1 | 7/2016 | Bergstrom et al. |
| 2016/0218335 A1 | 7/2016 | Baek |
| 2016/0222631 A1 | 8/2016 | Kohno et al. |
| 2016/0226040 A1 | 8/2016 | Mongeau et al. |
| 2016/0226108 A1 | 8/2016 | Kim et al. |
| 2016/0229309 A1 | 8/2016 | Mitsutani |
| 2016/0233468 A1 | 8/2016 | Nusier et al. |
| 2016/0236713 A1 | 8/2016 | Sakaguchi et al. |
| 2016/0248060 A1 | 8/2016 | Brambrink et al. |
| 2016/0248061 A1 | 8/2016 | Brambrink et al. |
| 2016/0257219 A1 | 9/2016 | Miller et al. |
| 2016/0280306 A1 | 9/2016 | Miyashiro et al. |
| 2016/0308180 A1 | 10/2016 | Kohda |
| 2016/0318579 A1 | 11/2016 | Miyashiro |
| 2016/0339855 A1 | 11/2016 | Chinavare et al. |
| 2016/0347161 A1 | 12/2016 | Kusumi et al. |
| 2016/0361984 A1 | 12/2016 | Manganaro |
| 2016/0368358 A1 | 12/2016 | Nagaosa |
| 2016/0375750 A1 | 12/2016 | Hokazono et al. |
| 2017/0001507 A1 | 1/2017 | Ashraf et al. |
| 2017/0005303 A1 | 1/2017 | Harris et al. |
| 2017/0005371 A1 | 1/2017 | Chidester et al. |
| 2017/0005375 A1 | 1/2017 | Walker |
| 2017/0029034 A1 | 2/2017 | Faruque et al. |
| 2017/0047563 A1 | 2/2017 | Lee et al. |
| 2017/0050533 A1 | 2/2017 | Wei et al. |
| 2017/0054120 A1 | 2/2017 | Templeman et al. |
| 2017/0062782 A1 | 3/2017 | Cho et al. |
| 2017/0084890 A1 | 3/2017 | Subramanian et al. |
| 2017/0088013 A1 | 3/2017 | Shimizu et al. |
| 2017/0088178 A1 | 3/2017 | Tsukada et al. |
| 2017/0106907 A1 | 4/2017 | Gong et al. |
| 2017/0106908 A1 | 4/2017 | Song |
| 2017/0144566 A1 | 5/2017 | Aschwer et al. |
| 2017/0190243 A1 | 7/2017 | Duan et al. |
| 2017/0194681 A1 | 7/2017 | Kim et al. |
| 2017/0200925 A1 | 7/2017 | Seo et al. |
| 2017/0214018 A1 | 7/2017 | Sun et al. |
| 2017/0222199 A1 | 8/2017 | Idikurt et al. |
| 2017/0232859 A1 | 8/2017 | Li |
| 2017/0288185 A1 | 10/2017 | Maguire |
| 2017/0331086 A1 | 11/2017 | Frehn et al. |
| 2018/0050607 A1 | 2/2018 | Matecki et al. |
| 2018/0062224 A1 | 3/2018 | Drabon et al. |
| 2018/0154754 A1 | 6/2018 | Rowley et al. |
| 2018/0186227 A1 | 7/2018 | Stephens et al. |
| 2018/0229593 A1 | 8/2018 | Hitz et al. |
| 2018/0233789 A1 | 8/2018 | Iqbal et al. |
| 2018/0236863 A1 | 8/2018 | Kawabe et al. |
| 2018/0237075 A1 | 8/2018 | Kawabe et al. |
| 2018/0323409 A1 | 11/2018 | Maier |
| 2018/0334022 A1 | 11/2018 | Rawlinson et al. |
| 2018/0337374 A1 | 11/2018 | Matecki et al. |
| 2018/0337377 A1 | 11/2018 | Stephens et al. |
| 2018/0337378 A1 | 11/2018 | Stephens et al. |
| 2019/0081298 A1 | 3/2019 | Matecki et al. |
| 2019/0100090 A1 | 4/2019 | Matecki et al. |
| 2020/0001728 A1* | 1/2020 | Spielvogel ............. B60L 58/27 |

FOREIGN PATENT DOCUMENTS

| | | |
|---|---|---|
| AU | 2008200543 A1 | 8/2009 |
| CN | 100429805 C | 10/2008 |
| CN | 100429806 C | 10/2008 |
| CN | 102452293 A | 5/2012 |
| CN | 102802983 A | 11/2012 |
| CN | 103568820 A | 2/2014 |
| CN | 104010884 A | 8/2014 |
| CN | 106029407 A | 10/2016 |
| CN | 205645923 U | 10/2016 |
| CN | 106207029 A | 12/2016 |
| CN | 106410077 A | 2/2017 |
| DE | 4105246 A1 | 8/1992 |
| DE | 4129351 A1 | 5/1993 |
| DE | 4427322 A1 | 2/1996 |
| DE | 19534427 A1 | 3/1996 |
| DE | 4446257 A1 | 6/1996 |
| DE | 202005018897 U1 | 2/2006 |
| DE | 102004062932 A1 | 8/2006 |
| DE | 102007012893 A1 | 3/2008 |
| DE | 102007017019 A1 | 3/2008 |
| DE | 102007030542 A1 | 3/2008 |
| DE | 102006049269 A1 | 6/2008 |
| DE | 202008006698 U1 | 7/2008 |
| DE | 102007011026 A1 | 9/2008 |
| DE | 102007021293 A1 | 11/2008 |
| DE | 102007044526 A1 | 3/2009 |
| DE | 102007050103 A1 | 4/2009 |
| DE | 102007063187 B3 | 4/2009 |
| DE | 102008051786 A1 | 4/2009 |
| DE | 102007063194 A1 | 6/2009 |
| DE | 102008034880 A1 | 6/2009 |
| DE | 102007061562 A1 | 7/2009 |
| DE | 102008010813 A1 | 8/2009 |
| DE | 102008024007 A1 | 12/2009 |
| DE | 102008034695 A1 | 1/2010 |
| DE | 102008034700 A1 | 1/2010 |
| DE | 102008034856 A1 | 1/2010 |
| DE | 102008034860 A1 | 1/2010 |
| DE | 102008034863 A1 | 1/2010 |
| DE | 102008034873 A1 | 1/2010 |
| DE | 102008034889 A1 | 1/2010 |
| DE | 102008052284 A1 | 4/2010 |
| DE | 102008059953 A1 | 6/2010 |
| DE | 102008059964 A1 | 6/2010 |
| DE | 102008059966 A1 | 6/2010 |
| DE | 102008059967 A1 | 6/2010 |
| DE | 102008059969 A1 | 6/2010 |
| DE | 102008059971 A1 | 6/2010 |
| DE | 102008054968 A1 | 7/2010 |
| DE | 102010006514 A1 | 9/2010 |
| DE | 102009019384 A1 | 11/2010 |
| DE | 102009035488 A1 | 2/2011 |
| DE | 102009040598 A1 | 3/2011 |
| DE | 102010014484 A1 | 3/2011 |
| DE | 102009043635 A1 | 4/2011 |
| DE | 102010006514 A1 | 8/2011 |
| DE | 102010009063 A1 | 8/2011 |
| DE | 102010012992 A1 | 9/2011 |
| DE | 102010012996 A1 | 9/2011 |

(56) References Cited

FOREIGN PATENT DOCUMENTS

| | | |
|---|---|---|
| DE | 102010013025 A1 | 9/2011 |
| DE | 102010028728 A1 | 11/2011 |
| DE | 102011011698 A1 | 8/2012 |
| DE | 102011013182 A1 | 9/2012 |
| DE | 102011016526 A1 | 10/2012 |
| DE | 102011017459 A1 | 10/2012 |
| DE | 102011075820 A1 | 11/2012 |
| DE | 102011103990 A1 | 12/2012 |
| DE | 102011080053 A1 | 1/2013 |
| DE | 102011107007 A1 | 1/2013 |
| DE | 102011109309 A1 | 2/2013 |
| DE | 102011111537 A1 | 2/2013 |
| DE | 102011112598 A1 | 3/2013 |
| DE | 102011086049 A1 | 5/2013 |
| DE | 102011109011 A1 | 5/2013 |
| DE | 102011120010 A1 | 6/2013 |
| DE | 102012000622 A1 | 7/2013 |
| DE | 102012001596 A1 | 8/2013 |
| DE | 102012102657 A1 | 10/2013 |
| DE | 102012103149 A1 | 10/2013 |
| DE | 102013205215 A1 | 10/2013 |
| DE | 102013205323 A1 | 10/2013 |
| DE | 202013104224 U1 | 10/2013 |
| DE | 102012012897 A1 | 1/2014 |
| DE | 102012107548 A1 | 2/2014 |
| DE | 102012219301 A1 | 2/2014 |
| DE | 202012104339 U1 | 2/2014 |
| DE | 102012018057 A1 | 3/2014 |
| DE | 102013200562 A1 | 7/2014 |
| DE | 102013200726 A1 | 7/2014 |
| DE | 102013200786 A1 | 7/2014 |
| DE | 102013203102 A1 | 8/2014 |
| DE | 102013102501 A1 | 9/2014 |
| DE | 102013208996 A1 | 11/2014 |
| DE | 102013215082 A1 | 2/2015 |
| DE | 102013218674 A1 | 3/2015 |
| DE | 102014011609 A1 | 3/2015 |
| DE | 102014217188 A1 | 3/2015 |
| DE | 102013016797 A1 | 4/2015 |
| DE | 102013223357 A1 | 5/2015 |
| DE | 102014100334 A1 | 7/2015 |
| DE | 202015005208 U1 | 8/2015 |
| DE | 102014203715 A1 | 9/2015 |
| DE | 102014106949 A1 | 11/2015 |
| DE | 202014008335 U1 | 1/2016 |
| DE | 202014008336 U1 | 1/2016 |
| DE | 102014011727 A1 | 2/2016 |
| DE | 102014215164 A1 | 2/2016 |
| DE | 102014112596 A1 | 3/2016 |
| DE | 102014219644 A1 | 3/2016 |
| DE | 102014115051 A1 | 4/2016 |
| DE | 102014221167 A1 | 4/2016 |
| DE | 102014019696 A1 | 6/2016 |
| DE | 102014224545 A1 | 6/2016 |
| DE | 102015015504 A1 | 6/2016 |
| DE | 102015014337 A1 | 7/2016 |
| DE | 102015200636 A1 | 7/2016 |
| DE | 102015204216 A1 | 9/2016 |
| DE | 202016005333 U1 | 9/2016 |
| DE | 102015219558 A1 | 4/2017 |
| DE | 102015222171 A1 | 5/2017 |
| EP | 0705724 A2 | 4/1996 |
| EP | 0779668 A1 | 6/1997 |
| EP | 0780915 A1 | 6/1997 |
| EP | 1939028 A1 | 7/2008 |
| EP | 2298690 A1 | 3/2011 |
| EP | 2374646 A2 | 10/2011 |
| EP | 2388851 A1 | 11/2011 |
| EP | 2456003 A1 | 5/2012 |
| EP | 2467276 A1 | 6/2012 |
| EP | 2554420 A1 | 2/2013 |
| EP | 2562065 A1 | 2/2013 |
| EP | 2565958 A1 | 3/2013 |
| EP | 2581249 A1 | 4/2013 |
| EP | 2620997 A1 | 7/2013 |
| EP | 2626231 A2 | 8/2013 |
| EP | 2626232 A2 | 8/2013 |
| EP | 2626233 A2 | 8/2013 |
| EP | 2741343 A1 | 6/2014 |
| EP | 2758262 A1 | 7/2014 |
| EP | 2833436 A1 | 2/2015 |
| EP | 2913863 A1 | 9/2015 |
| EP | 2944493 A1 | 11/2015 |
| EP | 2990247 A1 | 3/2016 |
| EP | 3379598 A1 | 9/2018 |
| EP | 3382774 A1 | 10/2018 |
| FR | 2661281 A1 | 10/1991 |
| FR | 2705926 A1 | 12/1994 |
| FR | 2774044 B2 | 7/1998 |
| FR | 2774044 A1 | 7/1999 |
| FR | 2782399 A1 | 2/2000 |
| FR | 2861441 A1 | 4/2005 |
| FR | 2948072 A1 | 1/2011 |
| FR | 2949096 A3 | 2/2011 |
| FR | 2959454 A1 | 11/2011 |
| FR | 2961960 A1 | 12/2011 |
| FR | 2962076 A1 | 1/2012 |
| FR | 2975230 A1 | 11/2012 |
| FR | 2976731 A1 | 12/2012 |
| FR | 2982566 A1 | 5/2013 |
| FR | 2986374 A1 | 8/2013 |
| FR | 2986744 A1 | 8/2013 |
| FR | 2986910 A1 | 8/2013 |
| FR | 2986911 A1 | 8/2013 |
| FR | 2987000 A1 | 8/2013 |
| FR | 2987001 A1 | 8/2013 |
| FR | 2988039 A1 | 9/2013 |
| FR | 2990386 A1 | 11/2013 |
| FR | 2993511 A1 | 1/2014 |
| FR | 2994340 A1 | 2/2014 |
| FR | 2996193 A1 | 4/2014 |
| FR | 2998715 A1 | 5/2014 |
| FR | 2999809 A1 | 6/2014 |
| FR | 3000002 A1 | 6/2014 |
| FR | 3002910 A1 | 9/2014 |
| FR | 3007209 A1 | 12/2014 |
| FR | 3014035 A1 | 6/2015 |
| FR | 3019688 A1 | 10/2015 |
| FR | 3022402 A1 | 12/2015 |
| FR | 3028456 A1 | 5/2016 |
| GB | 2081495 A | 2/1982 |
| GB | 2353151 A | 2/2001 |
| GB | 2443272 A | 4/2008 |
| GB | 2483272 A | 3/2012 |
| GB | 2516120 A | 1/2015 |
| JP | 05193370 | 3/1993 |
| JP | H05193366 A | 8/1993 |
| JP | H05201356 A | 8/1993 |
| JP | H08268083 A | 10/1996 |
| JP | H08276752 A | 10/1996 |
| JP | H1075504 A | 3/1998 |
| JP | H10109548 A | 4/1998 |
| JP | H10149805 A | 6/1998 |
| JP | 2819927 B2 | 11/1998 |
| JP | H11178115 A | 7/1999 |
| JP | 2967711 B2 | 10/1999 |
| JP | 2000041303 A | 2/2000 |
| JP | 3085346 B2 | 9/2000 |
| JP | 3085346 B2 | 9/2000 |
| JP | 3199296 B2 | 8/2001 |
| JP | 3284850 B2 | 5/2002 |
| JP | 3284878 B2 | 5/2002 |
| JP | 3286634 B2 | 5/2002 |
| JP | 3489186 B2 | 1/2004 |
| JP | 2004142524 A | 5/2004 |
| JP | 2007331669 A | 12/2007 |
| JP | 2011006050 A | 1/2011 |
| JP | 2011049151 A | 3/2011 |
| JP | 2011152906 A | 8/2011 |
| JP | 2013133044 A | 7/2013 |
| KR | 20120030014 A | 3/2012 |
| KR | 20140007063 A | 1/2014 |
| KR | 101565980 B1 | 11/2015 |
| KR | 101565981 B1 | 11/2015 |

(56) References Cited

FOREIGN PATENT DOCUMENTS

| | | |
|---|---|---|
| KR | 20160001976 A | 1/2016 |
| KR | 20160055712 A | 5/2016 |
| KR | 20160087077 A | 7/2016 |
| KR | 101647825 B1 | 8/2016 |
| KR | 20160092902 A | 8/2016 |
| KR | 20160104867 A | 9/2016 |
| KR | 20160111231 A | 9/2016 |
| KR | 20160116383 A | 10/2016 |
| KR | 20170000325 A | 1/2017 |
| KR | 101704496 B1 | 2/2017 |
| KR | 20170052831 A | 5/2017 |
| KR | 20170062845 A | 6/2017 |
| KR | 20170065764 A | 6/2017 |
| KR | 20170065771 A | 6/2017 |
| KR | 20170065854 A | 6/2017 |
| KR | 20170067240 | 6/2017 |
| KR | 20170070080 A | 6/2017 |
| SE | 507909 C2 | 7/1998 |
| TW | 201425112 A | 7/2014 |
| TW | I467830 B | 1/2015 |
| TW | I482718 B | 5/2015 |
| WO | 0074964 A1 | 12/2000 |
| WO | 2006100005 A2 | 9/2006 |
| WO | 2006100006 A1 | 9/2006 |
| WO | 2008104356 A1 | 9/2008 |
| WO | 2008104358 A1 | 9/2008 |
| WO | 2008104376 A1 | 9/2008 |
| WO | 2008131935 A2 | 11/2008 |
| WO | 2009080151 A1 | 7/2009 |
| WO | 2009080166 A1 | 7/2009 |
| WO | 2009103462 A1 | 8/2009 |
| WO | 2010004192 A2 | 1/2010 |
| WO | 2010012337 A1 | 2/2010 |
| WO | 2010012338 A1 | 2/2010 |
| WO | 2010012342 A1 | 2/2010 |
| WO | 2010040520 A2 | 4/2010 |
| WO | 2010063365 A1 | 6/2010 |
| WO | 2010069713 A1 | 6/2010 |
| WO | 2010076053 A1 | 7/2010 |
| WO | 2010076055 A1 | 7/2010 |
| WO | 2011030041 A1 | 3/2011 |
| WO | 2011083980 A2 | 7/2011 |
| WO | 2011106851 A2 | 9/2011 |
| WO | 2011116801 A1 | 9/2011 |
| WO | 2011116959 A2 | 9/2011 |
| WO | 2011121757 A1 | 10/2011 |
| WO | 2011134815 A1 | 11/2011 |
| WO | 2011134828 A1 | 11/2011 |
| WO | 2012025710 A2 | 3/2012 |
| WO | 2012063025 A2 | 5/2012 |
| WO | 2012065853 A1 | 5/2012 |
| WO | 2012065855 A1 | 5/2012 |
| WO | 2012069349 A1 | 5/2012 |
| WO | 2012084132 A2 | 6/2012 |
| WO | 2012093233 A1 | 7/2012 |
| WO | 2012097514 A1 | 7/2012 |
| WO | 2012114040 A1 | 8/2012 |
| WO | 2012116608 A1 | 9/2012 |
| WO | 2012119424 A1 | 9/2012 |
| WO | 2012163504 A2 | 12/2012 |
| WO | WO-2013020707 A2 | 2/2013 |
| WO | WO-2013027982 A2 | 2/2013 |
| WO | WO-2013042628 A1 | 3/2013 |
| WO | WO-2013080008 A2 | 6/2013 |
| WO | WO-2013188680 A1 | 12/2013 |
| WO | WO-2014114511 A1 | 7/2014 |
| WO | 2014140412 A1 | 9/2014 |
| WO | 2014140463 A1 | 9/2014 |
| WO | 2014183995 A1 | 11/2014 |
| WO | WO-2014191651 A2 | 12/2014 |
| WO | 2015018658 A1 | 2/2015 |
| WO | 2015043869 A1 | 4/2015 |
| WO | 2015149660 A1 | 10/2015 |
| WO | 2016029084 A1 | 2/2016 |
| WO | 2016046144 A1 | 3/2016 |
| WO | 2016046145 A1 | 3/2016 |
| WO | 2016046146 A1 | 3/2016 |
| WO | 2016046147 A1 | 3/2016 |
| WO | 2016072822 A1 | 5/2016 |
| WO | 2016086274 A1 | 6/2016 |
| WO | 2016106658 A1 | 7/2016 |
| WO | 2016132280 A1 | 8/2016 |
| WO | 2016203130 A1 | 12/2016 |
| WO | 2017025592 A1 | 2/2017 |
| WO | 2017032571 A1 | 3/2017 |
| WO | 2017060608 A1 | 4/2017 |
| WO | 2017084938 A1 | 5/2017 |
| WO | 2017103449 A1 | 6/2017 |
| WO | WO-2018033880 A2 | 2/2018 |
| WO | 2018065554 A1 | 4/2018 |
| WO | WO-20100796452 | 7/2018 |
| WO | 2018149762 A1 | 8/2018 |
| WO | WO-2018213475 A1 | 11/2018 |
| WO | WO-2019055658 A2 | 3/2019 |
| WO | WO-2019-071013 A1 | 4/2019 |

OTHER PUBLICATIONS

International Searhcing Authority, International Search Report and Written Opinion for Application No. PCT/IB2018/050066, dated Apr. 26, 2018.
Korean Intellectual Property Office (ISA), International Search Report and Written Opinion for International Application No. PCT/US2018/033009, dated Sep. 11, 2018.
Korean Intellectual Property Office (ISA), International Search Report and Written Opinion for International Application No. PCT/US2018/032760, dated Sep. 11, 2018.
Korean Intellectual Property Office (ISA), International Search Report and Written Opinion for International Application No. PCT/US2018/050889, dated Mar. 21, 2019.
Korean Intellectual Propery Office (ISA), International Search Report and Written Opinion for International Application No. PCT/US2018/054423, dated Jan. 28, 2019.

* cited by examiner

VEHICLE BATTERY TRAY WITH INTEGRATED BATTERY RETENTION AND SUPPORT FEATURE

CROSS-REFERENCE TO RELATED APPLICATIONS

This application claims benefit and priority under 35 U.S.C. § 119(e) of U.S. provisional application Ser. No. 62/506,949, filed May 16, 2017 and U.S. provisional application Ser. No. 62/649,641, filed Mar. 29, 2018, which are hereby incorporated herein by reference in their entireties.

TECHNICAL FIELD

The present invention generally relates to vehicle battery support structures for electric and hybrid electric vehicles, and more particularly to components or structures for holding and supporting electronic components therein, such as battery packs or modules or the like.

BACKGROUND

Electrically powered vehicles are typically designed to locate and package battery modules on the vehicle in a manner that protects the batteries from damage when driving in various climates and environments, and also that protects the batteries from different types of impacts. It is also fairly common for vehicle frames to locate batteries in a portion of the frame or sub-structure of the vehicle, such as between the axles and near the floor of the vehicle, which can distribute the weight of the batteries across the vehicle frame and establish a low center of gravity for the vehicle.

SUMMARY

The present disclosure provides a battery tray for an electric vehicle, such as an all-electric or hybrid electric vehicle, where the battery tray has retention features or elements integrated with a portion of the tray or a portion of the battery modules themselves, such as in a manner that function to secure the battery modules or other components in and to the battery tray. The retention elements may be integrally formed with a portion of the battery tray to engage the battery modules disposed in the containment area of the battery tray, such as to engage peripheral or corner portions of the battery modules to secure the battery modules in a desired location, such as at a location spaced from the floor of the tray or spaced from adjacent battery modules. The retention elements may also or alternatively be integrally formed with a portion of the tray in a manner that is configured to engage a component that is disposed in the battery containment area, such as a coolant line, an electrical cable, a cooling plate, a portion of a fire suppression system, or a portion of a battery module. To further support and secure the battery modules in the battery tray, the integral retention elements may also or alternatively include a flange or extension that engages a cross member of the battery support structure, such as by fastening the flange or extension to a cross member of the battery tray that spans across the battery containment area. The retention elements may be integrally formed or molded with the portion of the tray to assist in forming a sealed battery containment area that is resistant to leaks or penetration of gases or liquids. Such integrated retention elements may improve connection reliability and also reduce the number of overall components used to make the battery tray and the associated connection and attachment points of such additional components.

According to one aspect of the present disclosure, a battery tray for an electric vehicle includes a battery support structure that has a floor and a perimeter wall extending around a peripheral portion of the floor to border a battery containment area. A plurality of cross members are coupled with the perimeter wall at opposing sides of the battery support structure, where the cross members extend laterally across the battery containment area. A cover is engaged with an upper portion of the perimeter wall of the battery support structure. The cover, the floor, and/or the cross members may include a retention element that is integrally formed therewith and that is configured to engage a component that is disposed in the battery containment area. For example, the cover may include a battery retention element that has a bracing portion that is configured to engage an upper corner portion of a battery module.

According to another aspect of the present disclosure, a battery tray for an electric vehicle includes a battery support structure that has a floor, a perimeter wall extending around a peripheral portion of the floor, and a plurality of cross members extending laterally across the battery containment area between opposing sides of the perimeter wall. A battery module is disposed in the battery containment area between two adjacent cross members of the plurality of cross members. At least a portion of the battery support structure or a portion of the battery module may include a retention element that is integrally formed therewith and that is configured to secure the battery module in the battery containment area.

According to yet another aspect of the present disclosure, a battery tray for an electric vehicle includes a battery support structure that has a floor and a plurality of cross members extending laterally over the floor to define separated battery containment areas. At least one battery module may be disposed at one of the battery containment areas between two adjacent cross members. The battery module may include a retention element that comprises an upper flange that protrudes at least partially over and engages each of the two adjacent cross members, such as a flange that extends from an end casting of the battery module over an upper surface of the cross member.

According to another aspect of the present disclosure, the battery tray for an electric vehicle includes a battery support structure that has a floor and a perimeter wall extending around a peripheral portion of the floor to border a battery containment area. A plurality of cross members are coupled with the perimeter wall at opposing sides of the battery support structure, where the cross members extend laterally across the battery containment area. A cover is engaged with an upper portion of the perimeter wall of the battery support structure, where the cover may include one or more battery retention elements that protrude downward into the battery containment area and are configured to engage battery modules disposed in the battery containment area. The battery retention elements may each include a bracing portion that is configured to engage an upper corner portion of a battery module.

These and other objects, advantages, purposes, and features of the present disclosure will become apparent upon review of the following specification in conjunction with the drawings.

DETAILED DESCRIPTION

Figure 1:
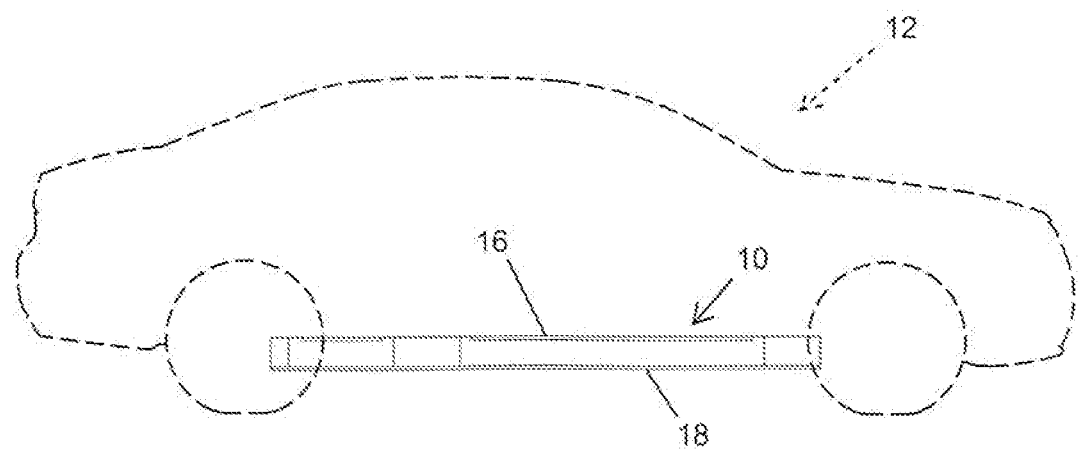
FIG. 1 is a side elevation view of a battery tray at a mounting location on a vehicle in accordance with the present disclosure.

Referring now to the drawings and the illustrative embodiments depicted therein, a vehicle battery tray or structure 10 may be provided for supporting and protecting batteries, such as battery packs or modules or the like, for an electric vehicle 12, such as shown in FIG. 1. The electric vehicle may be an all-electric or a hybrid electric vehicle or vehicle that is otherwise propelled or operated using stored electricity. The battery tray 10 may be attached or mounted at or near the lower frame or rocker rails of the vehicle 12, so as to locate the contained batteries or battery modules 14 (FIG. 3) generally in a central location on the vehicle 12, away from probable impact locations and also in a location that evenly distributes the weight of the batteries 14 and provides the vehicle with a relatively low center of gravity. The battery tray 10 may span below the occupant compartment at a lower portion of the vehicle 12, such as shown in FIG. 1 with a generally thin profile, so as to accommodate various vehicle body types and designs. The profile or thickness of the battery tray 10 may be defined between the upper surface 16 and the lower surfaces 18 of the tray. It is contemplated that the battery tray 10 may be disengaged or detached from the lower portion of the vehicle 12, such as for replacing or performing maintenance on the batteries 14 or related electrical components.

Figure 3:
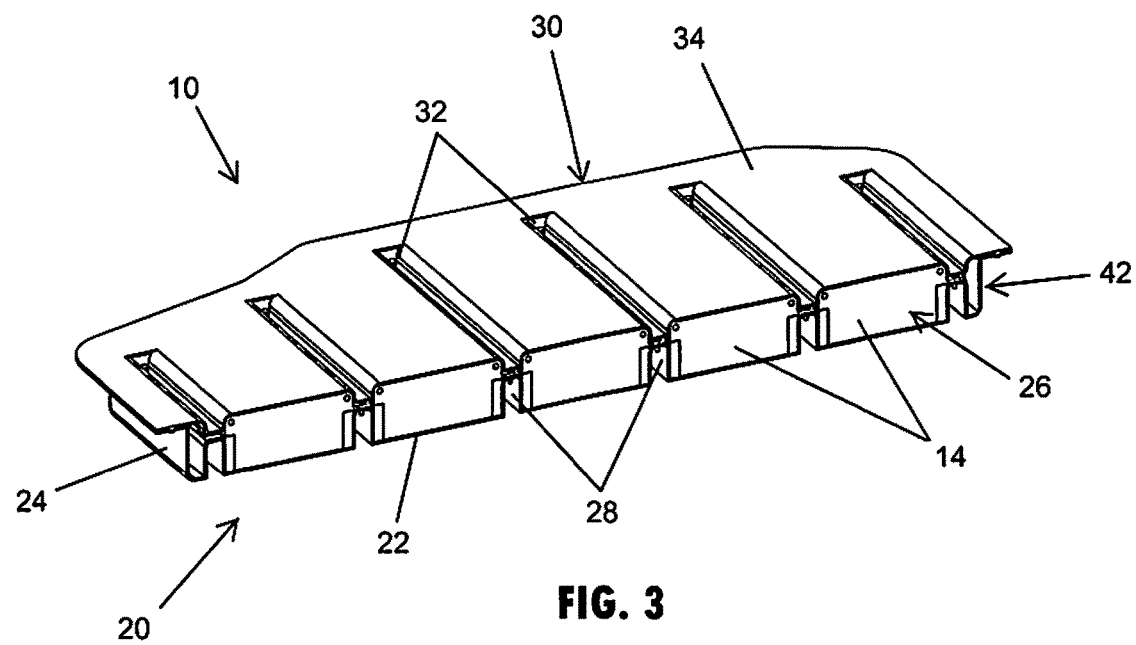
FIG. 3 is a cross-sectional upper perspective view of the battery tray shown in FIG. 2.

The battery modules 14 that operate an electric vehicle 12 are generally held in the battery tray 10 of the electric vehicle 12, such as shown in FIG. 3, and the battery modules 14 may be arranged to allow for associated components, such as electrical cables, coolant lines, cold plates, a fire suppression apparatus, or the like, to be arranged and protected within the battery tray 10. To secure and position these items and other conceivable ancillary components within the battery tray, such brake lines, lighting components, sensors or other vehicle-related accessories that may benefit from extending partially through or being housed in the battery tray, the present disclosure provides retention elements that are integrated with portions of the battery tray or the battery modules themselves in a manner that function to optimize packaging spaces within the battery tray. Such integrated retention elements may improve utilization of the available volume to hold battery modules and other systems and components, as efficient space utilization for these within the tray can be a significant factor in the ultimate battery capacity of an electric vehicle. Moreover, the integrated retention elements may serve a dual function of, in addition to retaining or supporting a component or accessor, also contributing to the structural performance of the battery tray, such as by functioning as an integrated stiffening feature or load bearing member. As disclosed in detail herein, the retention elements may be integrally formed or molded with portions of the tray floor, tray cover, cross members, or housings for the battery modules, among other structural portions of the battery tray.

Figure 4:
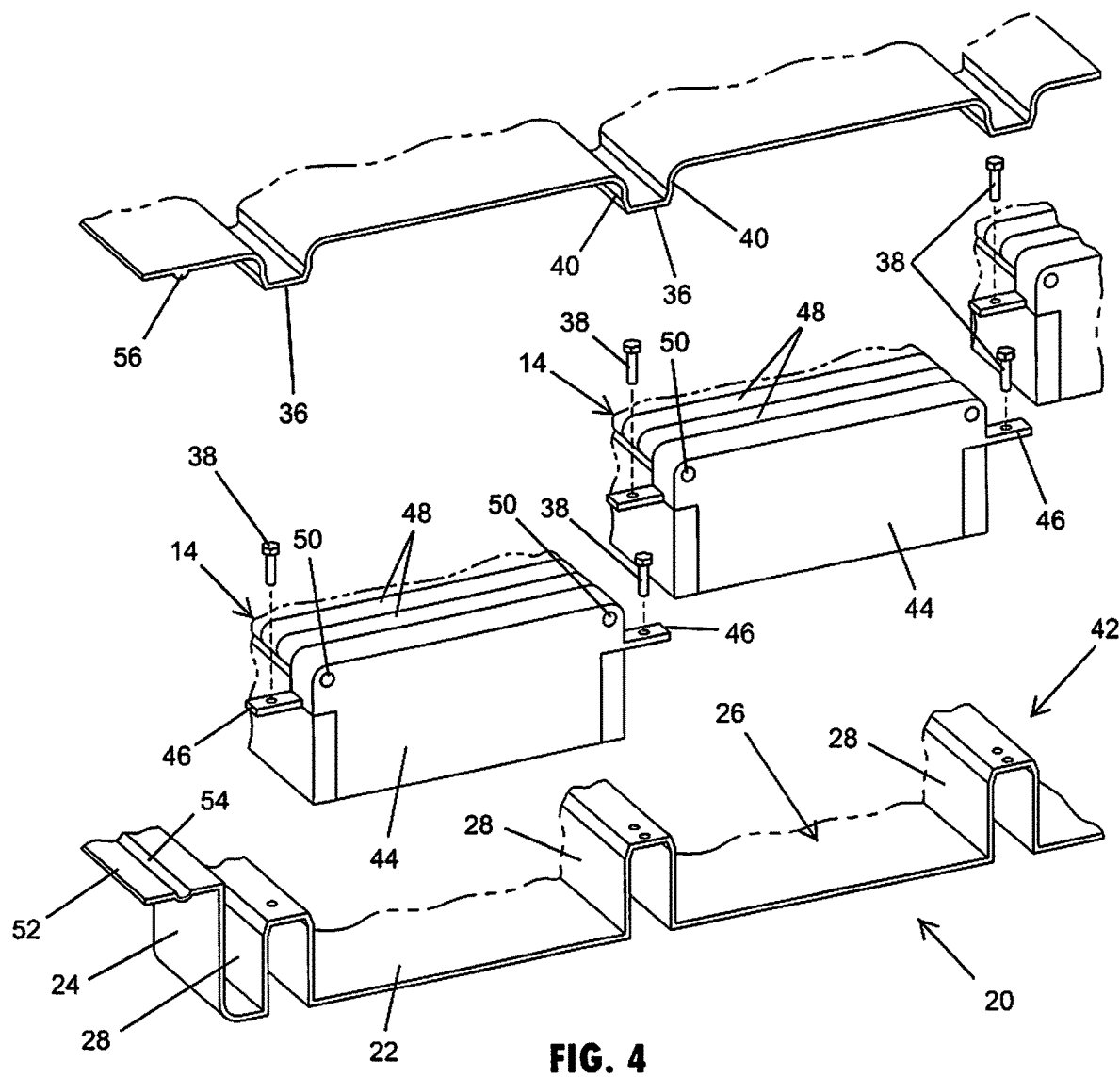
FIG. 4 is an exploded upper perspective view of the battery tray shown in FIG. 3A.

Referring now to FIGS. 2-5, the battery tray 10 may include a support structure 20 that has a floor 22 and a perimeter wall 24 that extends at least partially around a peripheral portion of the floor 22 to border a battery containment area 26. The battery support structure 20 may at least partially support the weight of the battery modules 14 and may provide the structural features or components that offer impact energy management, such as to absorb or direct impact forces away from or around the battery modules 14 supported in the battery tray 10. The battery tray 10 may also include cross members 28 that couple at opposing sides of the battery support structure 20, such as by attaching or integrally extending from the inside surface of the perimeter wall 24, so as to span across the battery containment area 26. The cross members 28 may each extend laterally in parallel alignment with each other and at a longitudinal spacing from each other that is configured to divide the battery containment area into areas that may each contain at least one battery module 14. The cross members 28 may be a piece of the battery support structure 20, such as shown in FIGS. 3-4, whereby the cross members 28 integrally protrude upward from the floor 22 as an integral piece with the floor 22. It is also contemplated that in additional embodiments of the battery tray that one or more of the cross members may be separately attached to a portion of the battery support structure, such as via fasteners, adhesive, or welding or the like. Furthermore, the battery support structure may be formed in multiple configurations with various materials and formation techniques, such as with metal, polymer, or composite components that are formed to provide portions of or the entire battery support structure or with other material configurations or combinations thereof.

Figure 2:
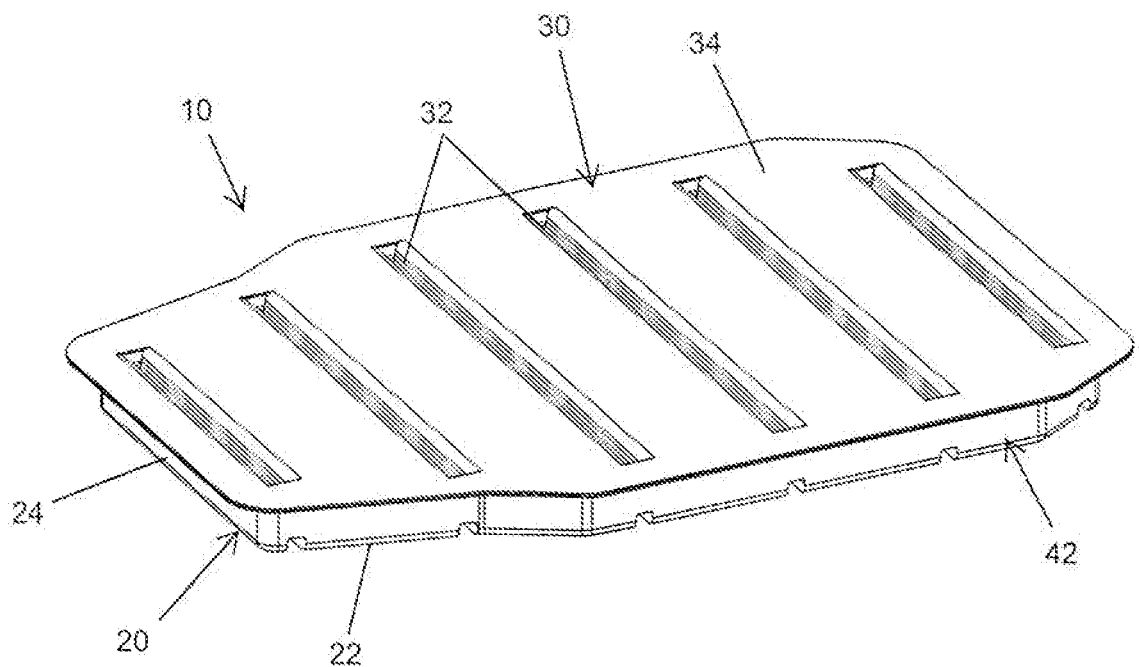
FIG. 2 is an upper perspective view of a battery tray having a cover with retention elements that secure battery modules in the battery containment area of the battery tray.
Figure 3A:
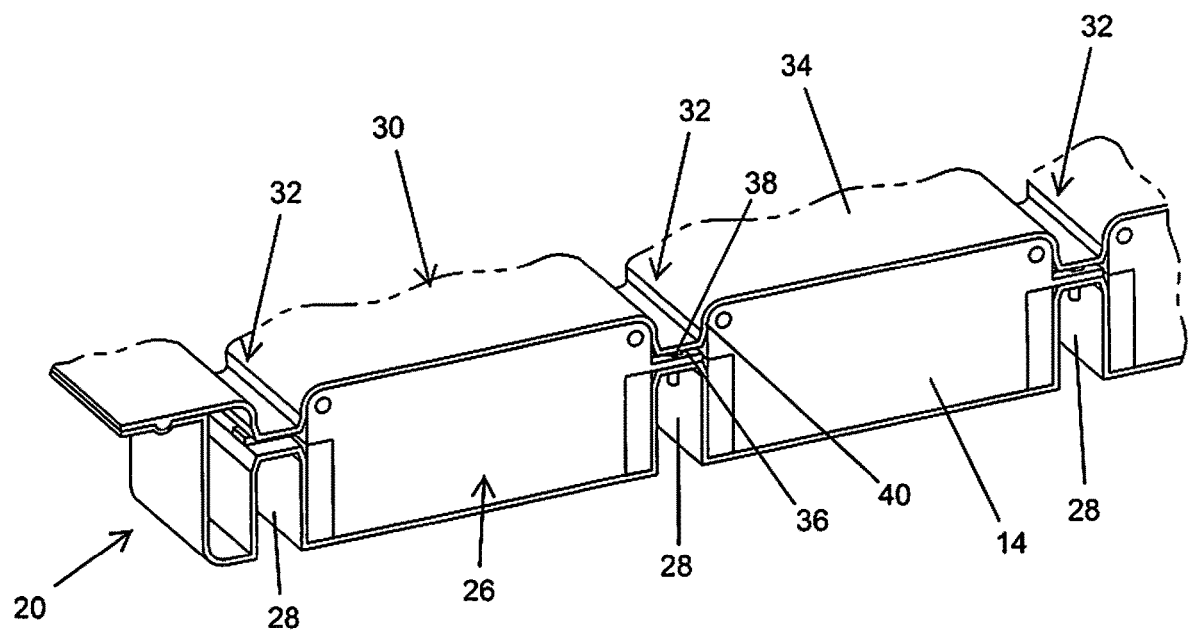
FIG. 3A is an enlarged view of a portion of the cross section shown in FIG. 3.

The battery tray 10 may also include a cover 30 that is disposed over the battery support structure 20 to at least partially cover or enclose the battery containment area 26 provided at least partially within the battery support structure 20. For example, it is contemplated that the cover may be recessed or otherwise shaped to provide some of the battery containment area. As shown in FIGS. 2 and 3, the cover 30 may engage with an upper portion of the perimeter wall 24 of the battery support structure 20, where at least a portion of the cover 30, such as a panel portion 34 of the cover 30, is spaced from the floor 22 of the battery support structure 20 to provide a desired volume for holding the battery modules 14 and associated electrical and cooling components. In accordance with one embodiment of the integrally formed retention elements, the cover 30 may include battery bracing elements 32 that are configured to engage the battery modules 14 disposed in the battery containment area 26. The battery bracing elements 32 may protrude or extend downward into the battery containment area 26, such as shown in FIG. 3A extending downward from the panel portion 34 of the cover 30 to engage the battery modules 14 at desired locations. With the cover 30 attached over the battery support structure 20, the battery bracing elements 32 may provide secure engagement of the upper portions of the battery modules 14 relative to the battery tray 10.

As further shown in FIGS. 3 and 3A, the battery bracing elements 32 may be formed to engage the battery modules 14 and may be coupled with the cross members 28, such as by being in engaged contact with the batter module fasteners 38 that extend into the cross members 28 or, in an alternative embodiment, being securely attached to or at the cross members. The battery bracing elements 32 may include a channel portion 36 (FIG. 4) that couples with the battery support structure 20, such as by being disposed over or at the upper surface of one of the cross members 28. In an additional embodiment such a channel portion may be attached or engaged to a cross member with a fastener that extends between the channel portion of a portion of the battery module and a cross member of the support structure to attach the cover to the battery tray. Thus, the channel portion 36 of the battery bracing elements 32 may in contact with or be attached to a portion of the battery support structure 20, such that the portion or feature of the battery bracing element 32 that engages the battery module 14 is reinforced or supported at the battery support structure 20. It is conceivable that the channel portion of the cover may also or alternatively be attached to the battery module fasteners and/or the battery support structure with adhesive or welding or the like or combinations thereof.

The battery bracing elements 32 may also include a corner bracing portion 40 that extends between the channel portion 36 and the panel portion 34 of the cover 30. Thus, the battery bracing elements 32 may also be referred to as integrally formed upper battery braces. As shown in FIG. 3A, the corner bracing portion 40 may be configured to engage a portion of a battery module 14, such as at an upper corner or other portion of the battery module 14 that may have an exposed vertical and horizontal oriented surface for engagement. The bracing portions 40 shown in FIG. 4 integrally extend upward from opposing sides of the channel portion 36 and integrally interconnect with a panel portion 34 of the cover 30, so as to form a U-shaped cross section. As such, the battery bracing elements 32 may be an integral piece of the shape of the cover 30. It is contemplated that the battery retention elements may have various shapes to accommodate various engagement locations of batter modules, such as a V shape or curved member, and may not have a portion that attaches to the battery support structure. It is further contemplated that additional embodiments of the cover may have separate, non-integral brackets or alternative means of attaching the battery modules to the battery tray.

As shown in FIGS. 2-5, the battery support structure 20 includes a tub component 42 that may be formed or molded, such as with a sheet molding compound (SMC), a stamped metal sheet, aluminum extrusion, or like metal or composite material, to provide an interior surface that is sealed and resistant to leaks or penetration of gases or liquids, so to protect the batteries or battery modules 14 supported in the tub component 42. The tub component 42, such as shown in FIG. 4, may at least partially provide the floor 22 and the perimeter wall 24 of the support structure 20, whereby the perimeter wall 24 integrally extends upward around a peripheral edge of the floor 22 to border the battery containment area 26. The portion of the floor 22 and the perimeter wall 24 provided by the tub component 42 may together form a solid and uninterrupted interior surface, whereby the angular or curved transition between the tub component 42 of the floor 22 and the perimeter wall 24 may vary depending on the battery tray requirements, but may generally be ninety degrees, such as with an abrupt or sharp corner angle or a curved corner transition, such as shown in FIG. 4. The tub component 42 may also include at least a portion of the cross members 28 integrally formed therewith, such as those illustrated in FIGS. 2-5, as each of the cross numbers 28 may integrally interconnect with the floor 22 and opposing sides of the perimeter wall 24 so as to span laterally across the battery containment area 26. The cross members 28 shown in FIG. 4 have an inverted U-shape or hat shape that provides structural support to the floor and perimeter wall, along with providing cross-car load path structure for impact energy management. It is also contemplated that the cross members may be formed in additional embodiments of the battery tray with retention elements, as further described below. Moreover, the cross members in additional embodiments may provide alternative cross-sectional shapes and may be separate pieces attached beneath or within the tub component.

The tub component 42 of the battery support structure 20 shown in FIGS. 2-5 may be sufficiently structural to support the battery modules and resist impacts, such as undercarriage road debris impacts and generally horizontal vehicle impacts, whereby additional structure may be unnecessary. However, in additional embodiments, the tub component may also be supported by a frame, such as a rigid metal or composite structure, to supplement or compliment the structure of the tub component. Such a frame may include longitudinal sections that coupled at exterior sides of the tub component and may also or alternatively include lateral sections, such as sections that are disposed at the front and rear ends of the tub component. Such a frame may have integrally formed pieces, such as a single beam wrapped around the tub component, or may be separate members or beams that are attached together or separately attached to the vehicle frame, each contemplated as various shapes, designs, and frame members configurations.

Figure 5:
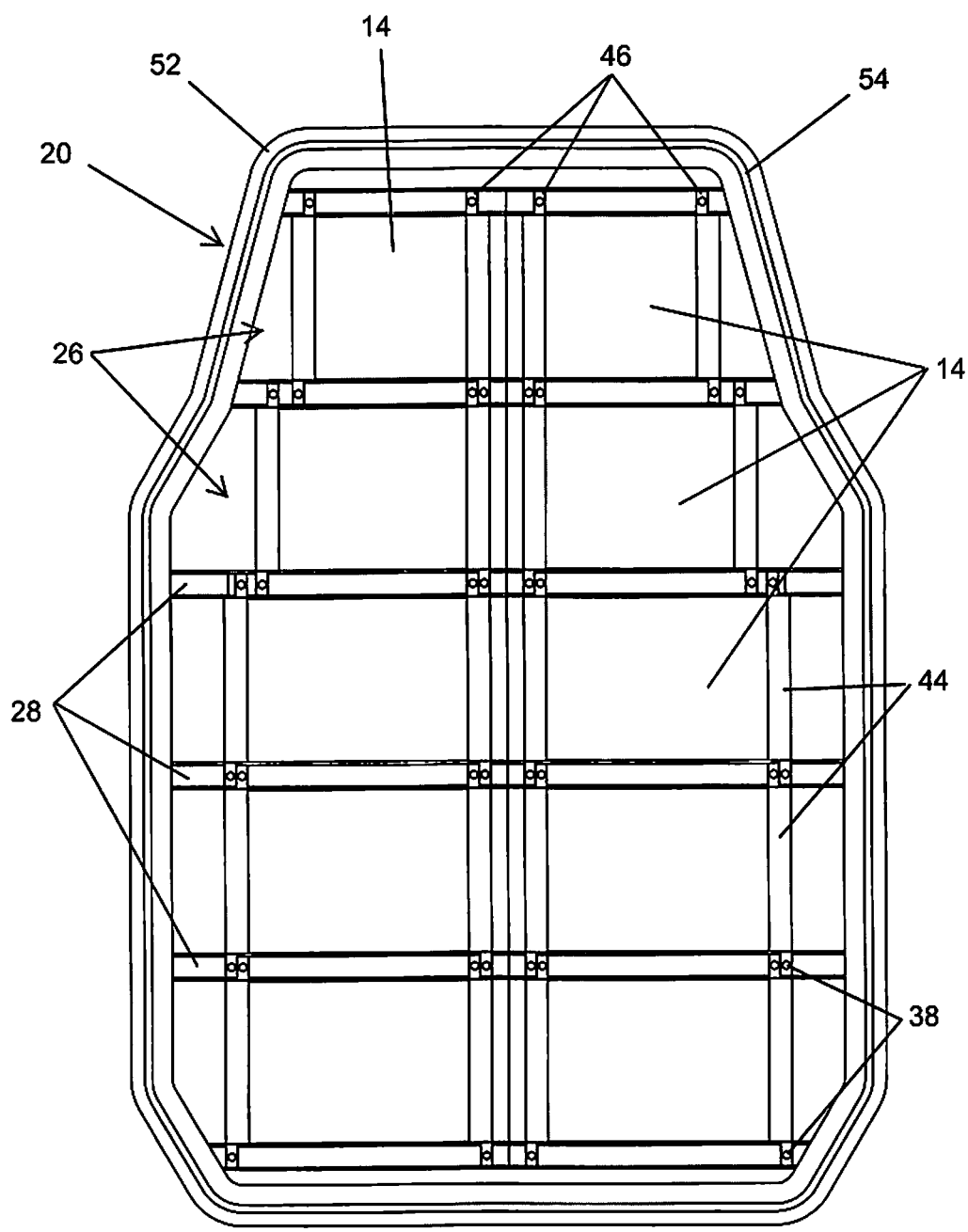
FIG. 5 is an upper plan view of the battery tray shown in FIG. 2, showing the cover removed to expose the battery modules in the tray.

As further illustrated in FIGS. 4 and 5, the battery modules 14 may be disposed at sections of the battery containment area 26 between the adjacent cross members 28. The battery modules 14 may be fastened directly to the battery support structure 20 to secure the battery modules in place. To provide such direct attachment, the battery modules 14 may include an end casting 44 that has another form of integrally formed retention element, which may comprise an extension or a flange 46 protruding outward from an upper portion of the battery module 14 to provide an attachment member for engaging the battery support structure 20. As shown in FIG. 5, the flanges 46 protrude forward and rearward from each of the battery modules 14 to at least partially extend over and engage an upper surface of a cross member 28 that borders a section of the containment area 26 occupied by the respective battery module 14. The flanges 46 shown in FIGS. 4 and 5 are arranged to nest the together with a flange of an adjacent battery module across the engaged cross member 28. A fastener 38 may extend though the upper flange 46 to engage the associated cross member 28, as shown in FIG. 4. It is also contemplated that the fastener hat engages the flange may also extend through the cover, such as through the channel portion of the retention element.

The battery modules 14 mounted in the battery tray 10 may have various configurations and designs. As shown in FIG. 4, the battery module 14 may retain a series of battery cells or plates or pouches 48 by securing the cells or pouches 48 between end castings 44, where a rod 50 may extend between the end castings 44 of each battery module 14 and through the associated cells or pouches 48. Thus, the rods 50 may be fastened at the end castings 44 to retain the cells or plates or pouches 48 and the structure of the respective battery module 14. The illustrated battery modules 14 each include two rods 50 extending through an upper corner portion of the end castings 44 in general alignment with the lateral span of the cross member 28. As shown in FIGS. 4 and 5, the flanges 46 may protrude from the end castings 44, with one of the flanges offset at least the width of the other flange protruding from the end casting 44. This offset of the flanges on the end casting may allow the flanges 46 to nest the together with an adjacent upper flange of a battery module disposed across a cross member 28 that may separate the battery modules 14. It is also contemplated that an alternatively nesting configuration may be provided for the retention elements or flanges of the battery modules.

Referring again to FIGS. 3-5, the perimeter wall portion 24 of the battery support structure 20 may include a peripheral flange 52 that protrudes outward away from the battery containment area 26 continuously around the perimeter of the support structure 20 at the upper portion of the perimeter wall 24. The flange 52 disposed at the perimeter wall 24 of the battery support structure 20 may be used to provide a consistent upper surface for the cover 30 to attach over the battery containment area, such as shown in FIG. 3. Also, the flange 52 may include a sealing channel 54 around the upper surface to contain a gasket, sealing adhesive, and/or lip 56 of the cover 30 to provide a sealed cover connection. However, it is contemplated that the flange in additional embodiments may protrude from an alternative location and/or orientation at the perimeter wall and may be provided at a select portion or portions of the perimeter wall portion so as to provide the desired engagement with the cover and base frame, if provided.

Figure 6:
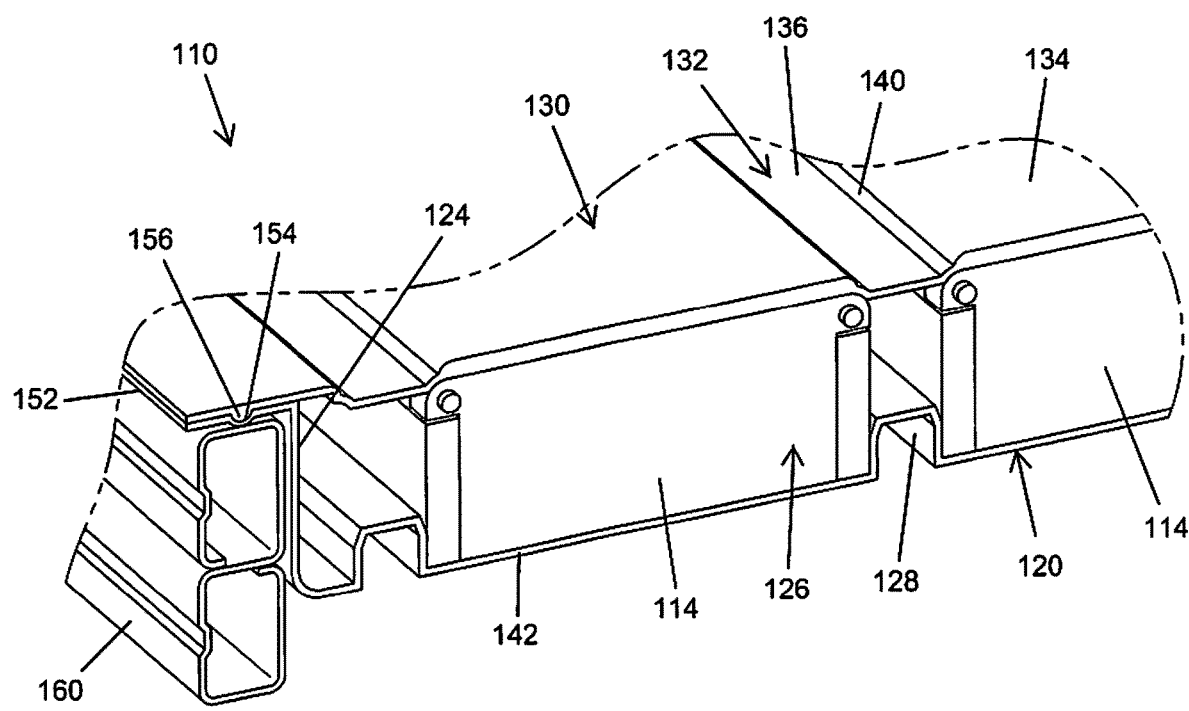
FIG. 6 is cross-sectional upper perspective view of an additional embodiment of a battery tray, showing cross members with reduced height.

Referring now to FIG. 6, an additional embodiment of a battery tray 110 is shown that has a cover 130 disposed over the tub component 142 of the battery support structure 120 to at least partially cover or enclose the battery containment area 126. The cover 130 may include a downward protrusion or lip 156 that engages with a sealing channel 154 at the flange 152 that is disposed at the upper portion of the perimeter wall 124 of the battery support structure 120. The cover 130 has battery bracing elements 132 that protrude downward into the battery containment area 126 from the panel portion 134 of the cover 130 to engage the battery modules 114. As shown in the embodiment illustrated in FIG. 6, the base portion 136 of the bracing elements 132 is spaced from the cross member 128 of the battery support structure 120 to provide additional interior volume in the battery tray 110, which may be used as an air flow channel for cooling and/or may be occupied by wiring or coolant lines or other components. The bracing portion 140 of the battery bracing elements 132 integrally extends between the base portion 136 and the panel portion 134 of the cover 130 and engage an upper corner of the respective battery module 114. The embodiment shown in FIG. 6 includes a metal base frame 160 coupled at front or rear exterior sides of the tub component 142 of the battery support structure 120 in engagement with the peripheral wall 124 and the flange 152 to supplement the battery support structure 120.

Figure 7:
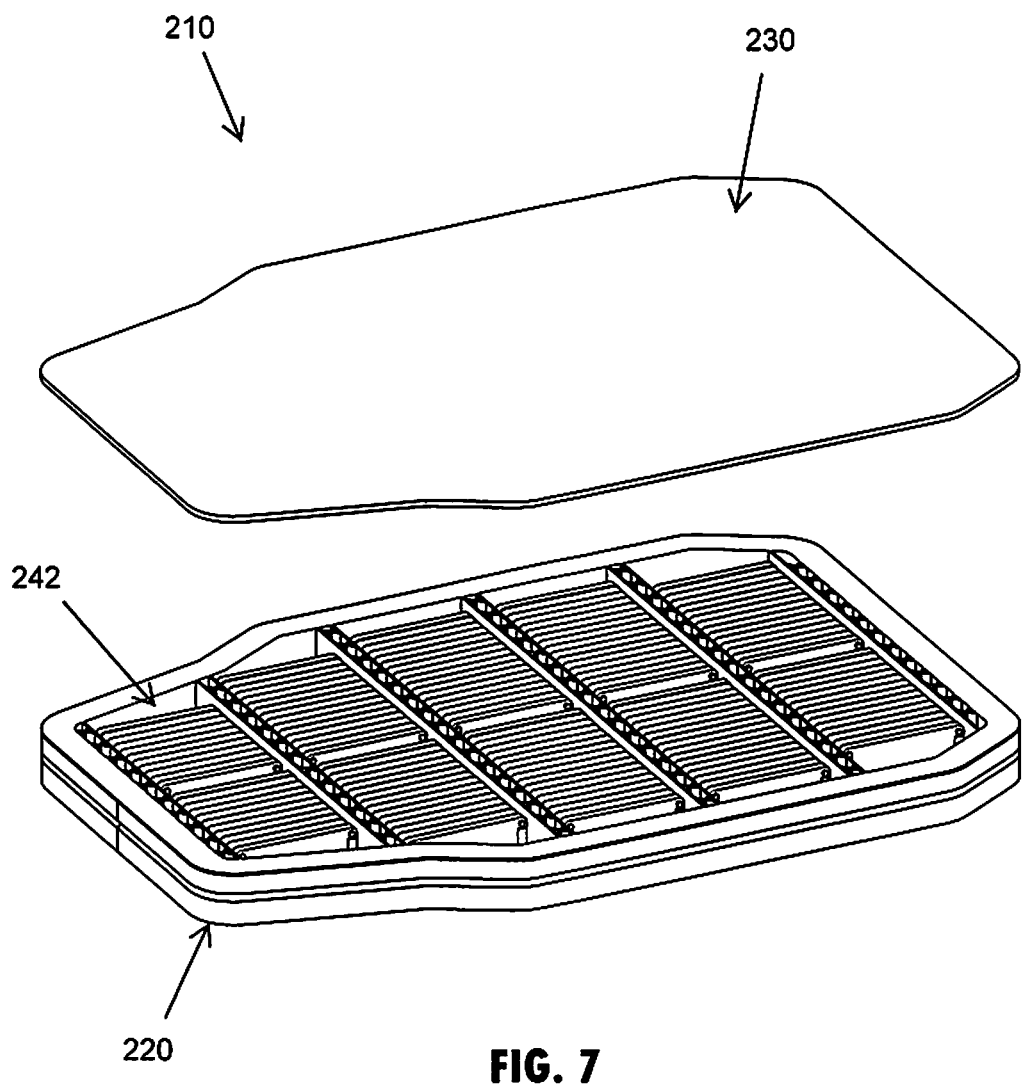
FIG. 7 is an upper perspective view of an additional embodiment of a battery tray, showing the cover exploded upward to expose the cross members and battery modules.
Figure 8:
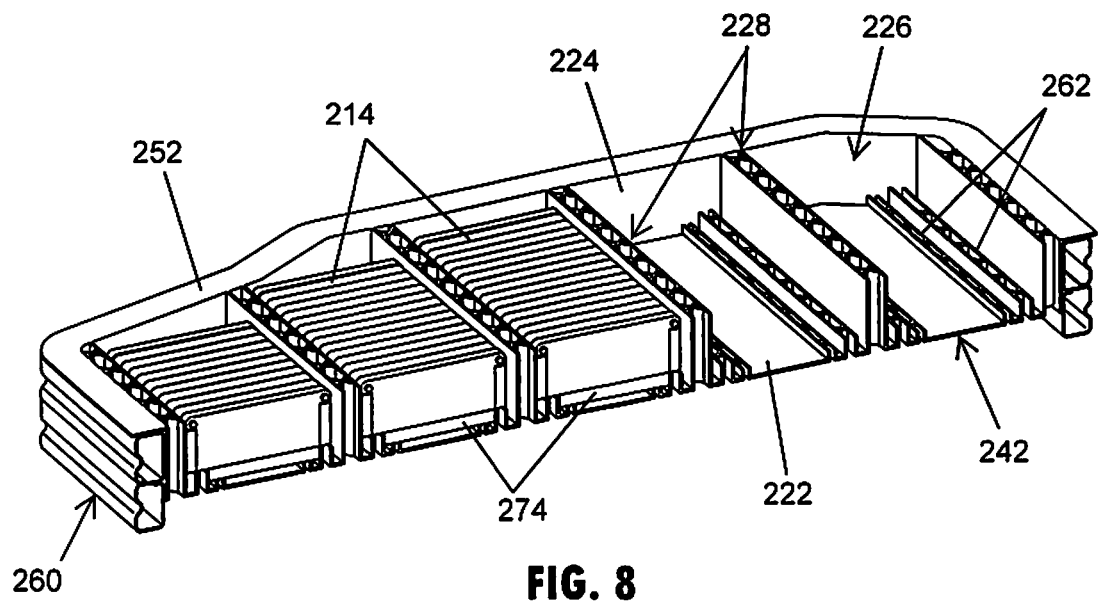
FIG. 8 is a cross-sectional upper perspective view of the battery tray shown in FIG. 7, showing some of the battery modules removed to expose support elements at the floor.
Figure 9:
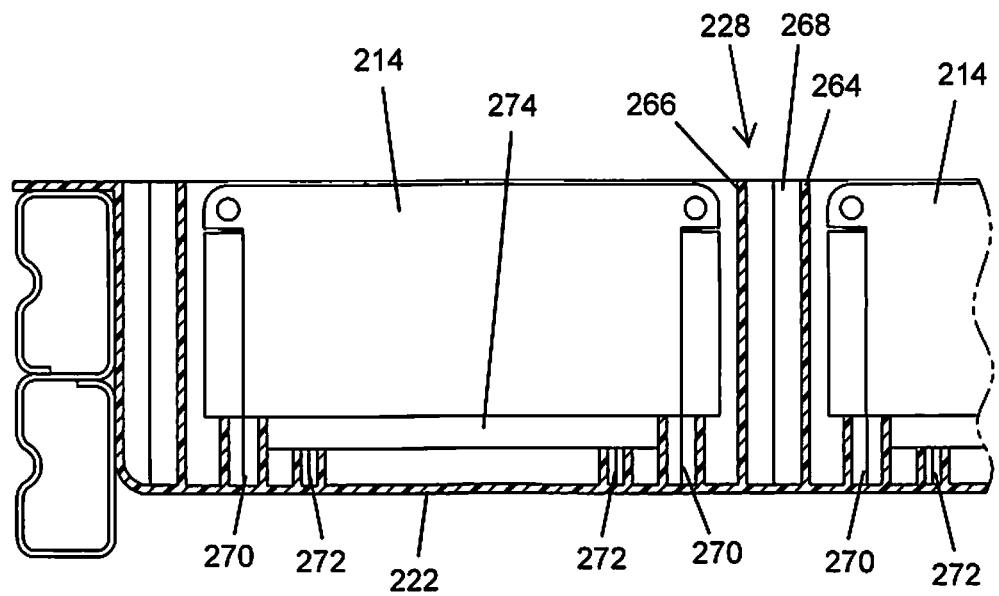
FIG. 9 is a cross-sectional view of the battery tray shown in FIG. 7.

As shown in FIGS. 7-9, an additional embodiment of the battery support structure 220 includes a tub component 242 that may be integrally formed as a single piece, such as with a sheet molding compound (SMC). The tub component 242, such as shown in FIG. 8, may include a floor 222 and a perimeter wall 224 that integrally extends upward around a peripheral edge of the floor 222 to border the battery containment area 226. The floor 222 and the perimeter wall 224 may together form a solid and uninterrupted interior surface, whereby the angular or curved transition between the floor 222 and the perimeter wall 224 may vary depending on the battery tray requirements, but may generally be ninety degrees, such as with an abrupt or sharp corner angle or a curved corner transition as shown in FIG. 9. The embodiment shown in FIGS. 7-9 also includes a metal base frame 260 disposed about the tub component 242 of the battery support structure 220 in engagement with the peripheral wall 224 and the flange 252 to supplement the battery support structure 220.

The tub component 242 may include integral structural features that are formed as a single piece with the tub component 242, such as to support the weight of the batteries or battery modules and to provide structure configured for impact energy management, among other functions. For example, as shown in FIG. 3, the tub component 242 includes cross member portions 228 that each integrally interconnecting with the floor portion 222 and opposing sides of the perimeter wall portion 224 so as to span laterally across the battery containment area 226. The cross member portions 228 of the tub component 242 each extend laterally in parallel alignment with each other and at a longitudinal spacing from each other that is configured to contain at least one battery module 214. Further, an integrally formed battery retention element, such as shown in FIGS. 8 and 9, may comprise a base support 262 that integrally protrudes upward from the floor 222 of the battery support structure 220 and is configured to engage and support a lower portion of a battery module or other component supported in the battery tray, such as a cold plate or other such component or apparatus. The base support 262 may integrally protrude upward from the tub component 242 and may comprises a sheet molding compound.

The tub component 242 shown in FIGS. 7-9 includes cross members 228 that each integrally interconnect with the floor 222 and opposing sides of the perimeter wall 224 so as to span laterally across the battery containment area 226. The cross member portions 228 may each include a forward wall section 264 and a rearward wall section 266 that may integrally interconnect with the floor portion 222 and wall portion 224 to similarly form a solid and uninterrupted interior surface. Thus, the forward and rearward wall section 264, 266 may sub-divide the battery containment area 226 into separate chambers to contain one or more battery modules 214. As shown in FIG. 8, the forward and rearward wall sections 264, 266 may also extend upward at a height that is substantially equal to the perimeter wall portion 224, such that the separate chambers of the battery containment area 226 may be isolated from each other, such as to provide prevent cross-contamination of the battery modules and to insulate the batter modules form each other.

The cross member portions 228, such as shown in FIGS. 7-9, may include stiffening features 268 that integrally interconnect between the forward and rearward wall sections 264, 266. The stiffening features 268 may also integrally extend upward from the floor portion 222 of the tub component 242, such as to have a generally consistent height with the forward and rearward wall sections 264, 266. The stiffening features 268 shown in FIGS. 7-9 include an x-shape when viewed from above, such that the stiffening features 268 may extend diagonally between the forward and rearward wall sections 264, 266. However, it is also contemplated that the cross members and stiffening features in additional embodiments may include additional or alternative shapes and configurations to provide the desired mass and support across the battery tray. The tub component may be configured to provide load paths along the cross member portions 228 for transferring lateral impact forces through the battery containment area 226, while generally limiting disruption to the battery modules 214 or other components supported therein.

The tub component 242 may also include additional integral features, such as a base support 262, which may comprise a battery support, a cold plate support, and other conceivable supportive structural features. As shown in FIGS. 8 and 9, the tub component 242 includes battery supports 270 that integrally extend upward from the floor portion 222 of the tub component 242 adjacent to and parallel with the cross member portions 228. The battery supports 270 may have a similar structural design to the cross member portions, such as shown with forward and reward wall portions and x-shaped stiffening features. The battery supports 270 may elevate the lower surface of the battery modules 214 away from the floor portion 222 of the tub component for air circulation and to provide an intrusion distance that prevents damage to the battery modules 214 from impacts to the bottom or lower surface of the battery tray 210.

Also, the tub component 242 may include cold plate supports 272 that integrally extend upward from the floor portion 222 of the tub component 242, such as shown in FIGS. 8 and 9 adjacent to and parallel with the battery supports 270. The cold plate supports 272 may also have a similar structural design to the cross member portions, such as shown with forward and reward wall portions and x-shaped stiffening features. The cold plate supports 272 may have a height that is configured to place a cold plate or cooling element 274 (FIG. 9), such as a thermoelectric component or a liquid cooled component, against or in thermal engagement with the lower surface of the battery module 214, such as shown in FIG. 8. However, the battery supports and cold plate supports in additional embodiments may have different designs, such as without forward and rearward walls or without stiffening features.

Referring now to FIGS. 10-13, another embodiment of a battery tray 310 may include a battery support structure 320 that has a perimeter containment wall 324 that generally surrounds a battery containment area 326 of the battery tray 310. The perimeter containment wall 324 may be formed by perimeter reinforcement members, such as side members 376 that extend longitudinally on opposing sides of the vehicle and front and rear members 378 that extend laterally at opposing ends of the vehicle. The overall shape of the perimeter container wall 324 may be generally rectangular or square or otherwise indented around wheel wells, but may also have various other designs to accommodate the shape and structure of the corresponding vehicle. The perimeter reinforcement members may be segmented into separate beams or integrally formed members or beams that encompass more than one section of the perimeter wall 324. Further, the reinforcement members may have hollow interiors or open areas extending along a length of the respective elongated reinforcement member. The elongated reinforcement members may include a roll formed beam, a welded multi-sheet beam, a pultruded beam, or an extruded beam or the like, where the shape and material of the reinforcement members may be adapted to absorb and reduce impact forces delivered to exterior portions of the battery tray. For example, elongated reinforcement members may be made with high strength steel, polymer or related composites, aluminum, combinations of materials or like materials. Also, in areas where the collision impact may not have a high risk or likelihood of interacting with the containment wall, the reinforcement member in that area may be formed in a more simplified shape with less and/or lighter material.

Figure 10:
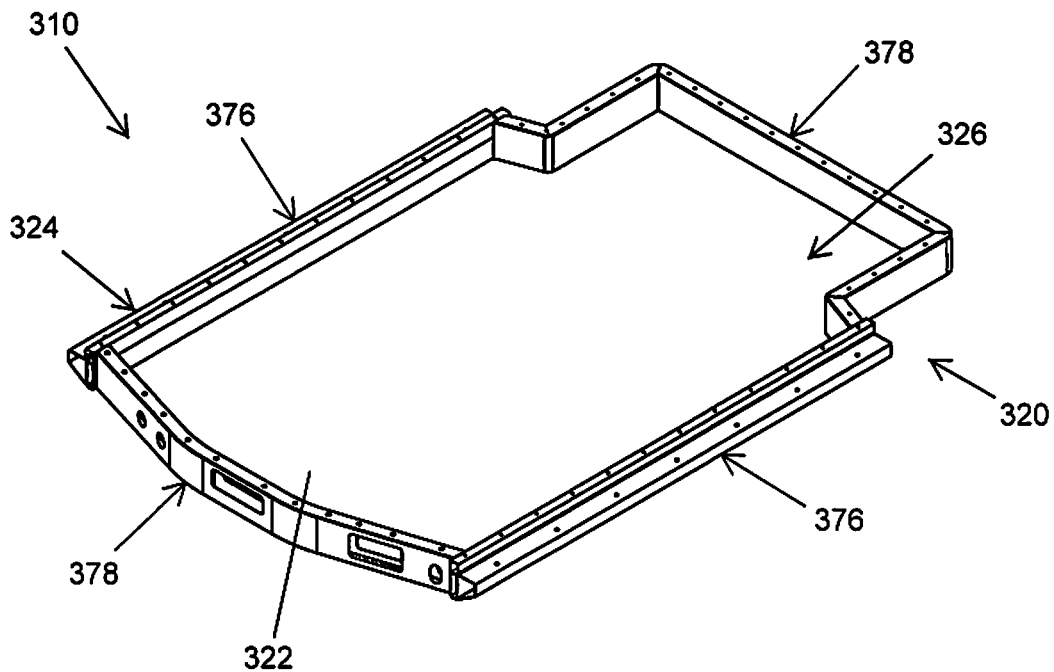
FIG. 10 is an upper perspective view of an additional embodiment of a battery tray, showing the cover and cross members removed.
Figure 11:
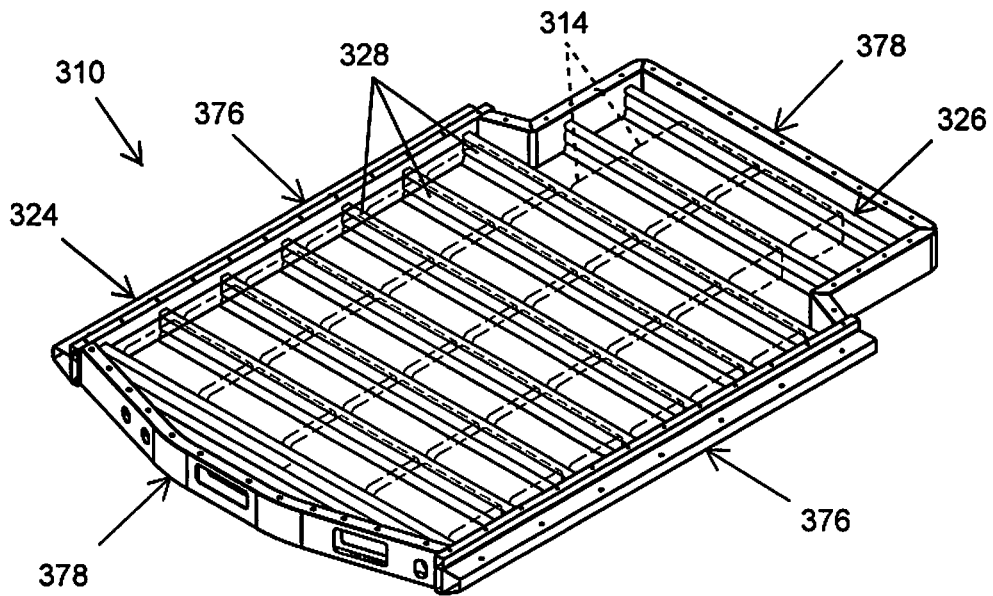
FIG. 11 is another upper perspective view of the battery tray shown in FIG. 10, showing the cross members and the battery modules in dashed lines.

The battery containment area 326 of the battery support structure 310 may be generally bounded on four sides, such as shown in FIGS. 10 and 11, by the longitudinally extending side reinforcement members 376 and by front and rear reinforcement members 378 that each extend laterally between the side reinforcement members 376. The side reinforcement members 376 may be configured to attach to rocker rails or like structure of a vehicle to secure the vehicle battery support structure 310 to the vehicle frame and suspend it away from the ground surface, such as at a generally inboard location on the vehicle that does not substantially come into a line of sight of a person standing outside of the vehicle.

With further reference to FIG. 11, cross members 328 may extend laterally to attach between the inside vertical surfaces of the side reinforcement members 376 and may attach with additional support provided with supplemental brackets. Also, a sealing agent or sealing material, such as an epoxy or silicone sealant or the like, may be provided around the brackets and/or at other seams at or along the reinforcement members, cross members, or other components within the battery containment area, such as to reinforce the seal along the containment wall 324 of the battery tray 310. However, it is understood that such sealed battery containment area may be vented for accommodating battery swelling or contraction, such as at a vented opening that may be difficult for water or liquid or debris to enter, such as by locating the vented opening at an upper portion or interior portion or of the battery tray or more specifically at an interior portion of a hollow cross member or hollow side reinforcement member, such that the end openings of the corresponding cross member or side reinforcement member vents out of the battery tray. Also or alternatively, such venting may be provided by providing the vented opening with a membrane or fabric cover that is air permeable and liquid impermeable to provide the desired liquid sealed environment for storing the batteries or electrical equipment or other vehicle-related item in the battery tray.

The cross members 328, such as shown in FIG. 11, may span laterally across the containment area 326 of the battery tray 310 and may be provided in substantially parallel alignment with each other. The cross members 328 of the battery tray 310 may be formed to have various cross-sectional shapes, such as a rectangular or other polygonal shape, a multi-tubular shape with legs intersecting the hollow interior, or an open shape, such as a U shape or V shape or the like. The cross members may thereby have substantially enclosed hollow interior areas extending along the lengths of the cross members, which may be used for venting the battery containment areas, similar to ducts or integral air passages. Similarly, the hollow interior areas or channels of the cross members may be used to route and/or conceal and/or secure electrical wiring, liquid or coolant lines, fire suppression apparatus, and other items or components.

Figure 12:
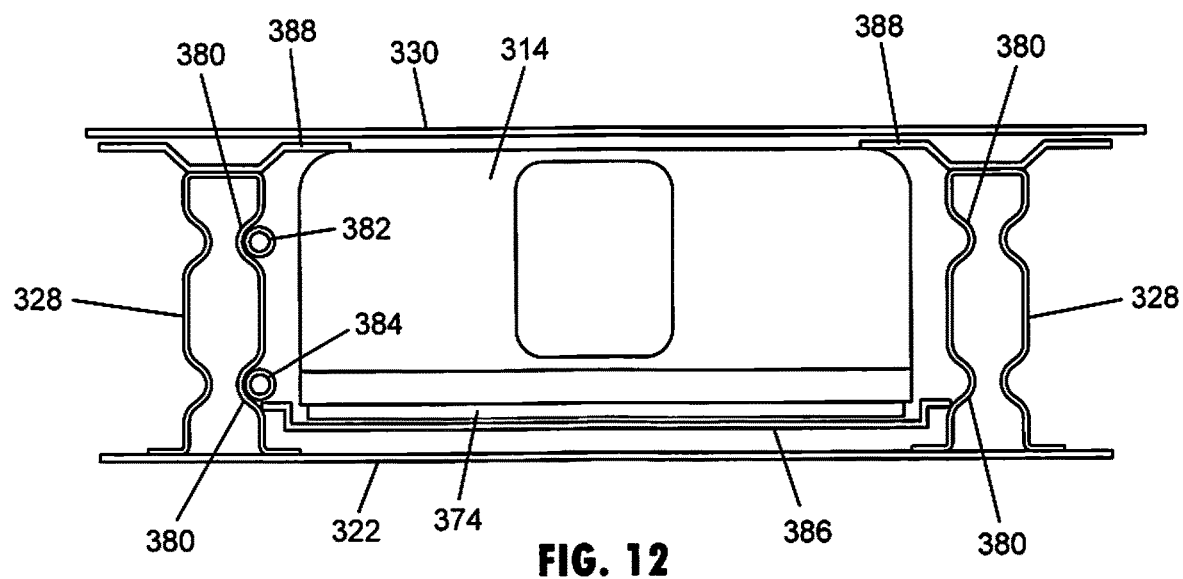
FIG. 12 is a cross-sectional view of the battery tray shown in FIG. 11, showing the cross members supporting a battery module away from the tray floor.
Figure 13:
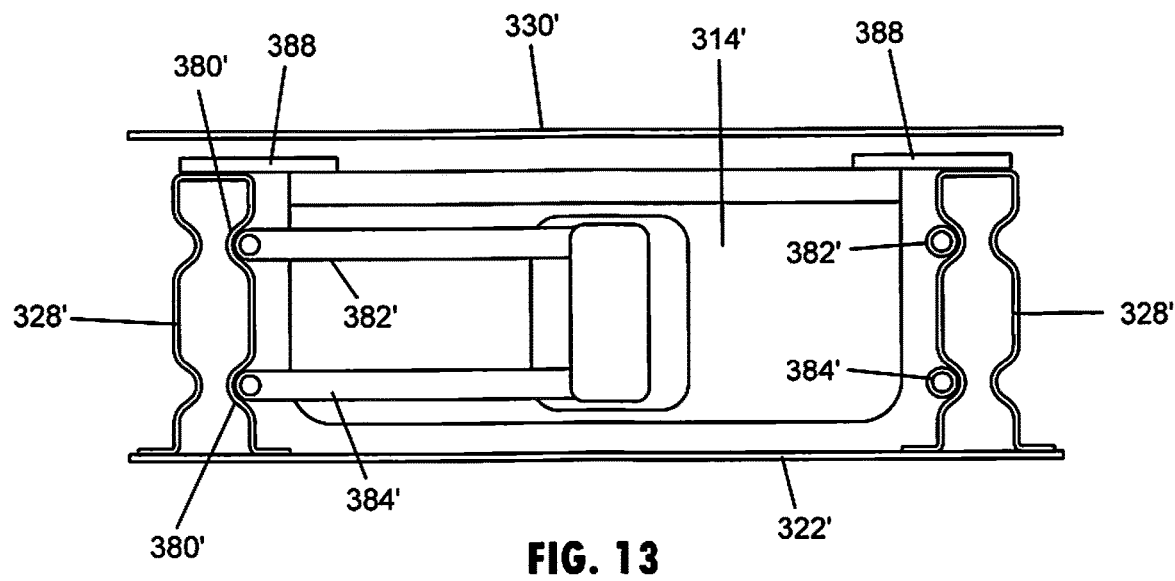
FIG. 13 is a cross-sectional view of an additional embodiment of a battery tray, showing the battery module suspended from upper portions of the cross members.

As shown in FIGS. 12 and 13, the illustrated cross members 328 have a hat-shaped cross section that provides a generally planar horizontal upper surface along the cross members 328, which may be used in providing an attachment or support surface for a battery module 314 or bracket 388 or the like. Lateral impact force may be transmitted through load paths along the cross members 328 to limit disruption to the battery containment area 326. Thus, the cross members 328 may span between the reinforcement members 376 to transmit lateral loads and impact forces through generally linear load paths along the cross members 328 to prevent laterally inward deformation to the reinforcement members 376 and thus limit disruption to the battery containment area 326.

The cross members 328 may include an integral retention element, such as a mounting feature 380 disposed at an upright side surface of the cross member 328 shown in FIG. 12. This mounting feature 380 may be provided to secure a component within the battery tray 310, such as an electrical cable, a coolant line, a support bracket, a portion of a battery module, a cold plate, a fire suppression apparatus, a brake line, a lighting component, a sensor, or other vehicle-related component or accessory that may benefit from extending partially through or being housed in the battery tray. For example, as shown in FIGS. 12 and 13, the mounting feature 380 may engage an electrical cable 382, 382' or coolant line 384, 384' or support bracket 386 (FIG. 12). More specifically, the mounting feature 380 may be a channel that is integrally formed into the side surface and continuously or intermittently extends along a length of the cross member 328. As such, it is contemplated that the mounting feature or integral channel may also or alternatively be formed at an interior surface of a side reinforcement member, a floor panel and/or other structural component of the battery tray. Like the reinforcement members that form the perimeter containment wall, the cross member may be formed by a roll formed, extruded, pultruded, or stamped beam that is separate or integrally formed with other portions of the battery tray, and such methods may thereby also be used to form the corresponding mounting feature on the cross member.

The mounting features 380 provided at the cross members 328 may include various shapes or portions, such as an outward protruding rib, protruding hook-shaped or T-shaped member, an aperture, a channel (FIGS. 12 and 13), or other various features that may be provided at the cross members 328 to assist with supporting an item in the containment area, and may also improve the structural performance of the cross member. These mounting features may vary for different cross members in the battery tray or at different portions or sides of the same cross member to accommodate the desired function. With reference to the mounting feature 380 shown in FIG. 12, two adjacent cross members 328 may each include channels 380 disposed at the upright side surfaces of the cross members 328. These channels 380 in the illustrated adjacent cross members 328 face each other and are each configured to receive an electrical cable or wire 382, a coolant line 384, and a support bracket 386. The support bracket 386 is shown in FIG. 3 spanning between and engaging the lower channels 380 to suspend a battery module 314 away from a floor 322 of the battery tray 310, which is provided by a panel that extends between the reinforcement members 376, 378 that form the peripheral wall 324 and/or the lower portion of the cross members 328. To facilitate installation and removal of the support bracket 386, the channels 380 may be disposed at approximately the same height away from the floor 322 of the battery tray 310. Also, a top bracket 388 is shown attached at an upper portion of the cross members 328, such as via welding, adhesive, and/or fasteners or the like. The top bracket 388 includes a flange that extends over and contacts an upper portion of the battery module 314 to clamp and secure the battery module 314 between the top bracket 388 and the support bracket 386.

In an additional embodiment shown in FIG. 13, the mounting features 380' are also shown as channels disposed at the upright side surfaces of the cross members 328' to receive and engage an electrical cable or wire 382' and a coolant line 384' in the recessed area provided by the channels 380'. The recessed engagement prevents the wires 382' and coolant lines 384' from resting on the floor 322', such as to prevent contact with liquid or debris that may enter and accumulate at the floor surface and to prevent close proximity with impacts to the floor 322', such as from undercarriage contact. The battery module 314' shown in FIG. 13 is suspended by battery brackets 388' that extend longitudinally from an upper portion of the battery module 314' to engages an upper surface of the cross members 328' for suspending the battery modules 314' away from the floor 322' of the battery tray 310', which may similarly be provided by a panel that extends between the elongated reinforcement member and/or cross members. Other details of this embodiment are otherwise the same or similar to those shown and described with reference to FIGS. 10-12.

Referring again to FIGS. 10 and 11, the reinforcement members 376, 378 may be formed with a generally consistent cross-sectional shape along their lengths and with a fixed height that substantially defines the height of the of the battery containment area 326. Thus, the side reinforcement members 376 may be formed to provide a height that is substantially identical to the height of the front and rear members 378, such that there may be a generally a constant height about the peripheral containment wall 324. This consistent height of the peripheral containment wall 324 provides even or generally flush top and bottom surfaces of the peripheral wall 324 for attaching a top cover or plate at the top surfaces and a floor 322 or base plate at the bottom surfaces, which together generally seal or contain the upper and lower portions of the battery containment area 326. The top cover may be attached in a manner that is relatively easy to remove while maintaining the sealed battery containment area, such as via bolts or screws or other removable fasteners that compress a gasket or other sealing member between the top cover and the top surface of the peripheral walls, so as to be able to remove the top cover and access the battery modules or other electric components housed in the battery containment area for replacement, maintenance, or inspection or the like. Similarly, the floor 322 may be attached to provide a sealed connection along the bottom surface of the peripheral walls 324, such as via welding, adhesive, bolts, screws, and/or fasteners or the like. The seal between the floor 322 and the reinforcement members 376, 378 may be reinforced or supplemented with a sealing agent or sealing material, such as an epoxy or silicone sealant or the like.

Several different attachment techniques and configurations may be used to permanently or releasable secure the battery support structure to a vehicle frame, such as below a floor of the vehicle and generally between the axles. Further, with respect to the general installation or attachment or formation, the steps discussed herein may be performed in various different sequences from those discussed to result in engaging, disengaging, or forming the battery support structure or components thereof.

For purposes of this disclosure, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A battery tray for an electric vehicle, said battery tray comprising:
 a battery support structure having a floor and a perimeter wall extending around a peripheral portion of the floor to border a battery containment area;
 a pair of cross members coupled at opposing lateral sides of the perimeter wall, wherein the pair of cross members extend laterally across the battery containment area at opposing longitudinal sides of a battery module disposed in the battery containment area;
 a cover engaged with an upper portion of the perimeter wall of the battery support structure and spanning over the battery containment area to conceal the battery module; and
 wherein the pair of cross members each comprise an elongated beam having a unitary and consistent cross-sectional shape along a length that spans between the opposing lateral sides of the perimeter wall, the elongated beams each comprising a retention element integrally formed therewith and along a side surface of the elongated beam that faces the other elongated beam of the pair of elongated beams, the retention elements each configured to engage a component that is disposed in the battery containment area, and wherein the retention element comprises a channel integrally formed at and protruding into the side surface of each of the pair of cross members.

2. The battery tray of claim 1, wherein the retention element engages a component that is selected from the group consisting of a coolant line, an electrical cable, a portion of a fire suppression system, and a portion of the battery module disposed between the pair of cross members.

3. The battery tray of claim 1, wherein the channel extends horizontally along a length of each of the pair of cross members, and wherein the channel is configured to receive at least one of a wire, cooling line, or a support bracket of the battery module disposed in the battery containment area.

4. The battery tray of claim 1, wherein the retention element comprises a pair of channels integrally formed at the side surface of each cross member of the pair of cross members, and wherein the pairs of channels face each other and two opposing channels of the pair of channels receive a support bracket that spans between and engages each of the cross members for suspending the battery module away from the floor of the battery support structure.

5. The battery tray of claim 4, wherein the pair of cross members each include a hollow interior area that extends along the length of the pair of cross members.

6. The battery tray of claim 1, wherein the battery module is engaged with the retention elements of the pair of cross members.

7. The battery tray of claim 6, wherein the pair of cross members attach to the floor of the battery support structure.

8. The battery tray of claim 6, wherein the retention element engages a support bracket that engages and supports the battery module disposed in the battery containment area.

* * * * *